(12) United States Patent
Das et al.

(10) Patent No.: US 7,707,133 B2
(45) Date of Patent: Apr. 27, 2010

(54) METHOD AND SYSTEM FOR MANAGING COMPUTER SYSTEMS

(75) Inventors: Saumitra Das, Santa Clara, CA (US); Stepan Sokolov, Fremont, CA (US); Bill 'Yuan-Chi' Chiu, El Monte, CA (US)

(73) Assignee: IPVenture, Inc., Los Altos, CA (US)

( * ) Notice: Subject to any disclaimer, the term of this patent is extended or adjusted under 35 U.S.C. 154(b) by 0 days.

(21) Appl. No.: 11/585,660

(22) Filed: Oct. 23, 2006

(65) Prior Publication Data

US 2007/0094212 A1      Apr. 26, 2007

Related U.S. Application Data

(63) Continuation of application No. 10/412,639, filed on Apr. 10, 2003, now abandoned.

(60) Provisional application No. 60/431,551, filed on Dec. 5, 2002, provisional application No. 60/371,659, filed on Apr. 10, 2002.

(51) Int. Cl.
*G06N 5/02* (2006.01)
*G06F 11/00* (2006.01)

(52) U.S. Cl. .......................... 706/50; 714/26

(58) Field of Classification Search ............. 706/45–48, 706/50–51, 59–61; 714/18, 26, 31, 48, E11.025
See application file for complete search history.

(56) References Cited

U.S. PATENT DOCUMENTS

| | | | |
|---|---|---|---|
| 5,239,487 A * | 8/1993 | Horejsi et al. ............... | 706/916 |
| 5,528,516 A | 6/1996 | Yemini et al. | |
| 5,761,502 A * | 6/1998 | Jacobs ........................ | 709/242 |
| 5,974,405 A | 10/1999 | McGuinness et al. | |
| 6,088,658 A | 7/2000 | Yazici et al. | |
| 6,108,800 A | 8/2000 | Asawa | |
| 6,336,139 B1 | 1/2002 | Feridun et al. | |
| 6,594,654 B1 * | 7/2003 | Salam et al. .................. | 707/3 |
| 6,628,516 B2 | 9/2003 | Boe | |

(Continued)

OTHER PUBLICATIONS

Roy,G. et al. "A Modeling Apporach to Root-cause Analysis—New Product Review: Patrol for Diagnostic Management" , BMC Software, Inc. pp. 1-8. Dec. 3, 2001.*

(Continued)

*Primary Examiner*—David R Vincent
*Assistant Examiner*—Benjamin Buss

(57) ABSTRACT

A management system for a computer system is disclosed. The computer system operates or includes various products (e.g., software products) that can be managed in a management system or collectively by a group of management systems. Typically, the management system operates on a computer separate from the computer system being managed. The management system can make use of a knowledge base of causing symptoms for previously observed problems at other sites or computer systems. In other words, the knowledge base can built from and shared by different users across different products to leverage knowledge that is otherwise disparate. The knowledge base typically grows over time. The management system can use its ability to request information from the computer system being managed together with the knowledge base to infer a problem root cause in the computer system being managed. The computer system being managed can also request the management system to process its knowledge base for possible problem cause analysis. The management system can also continually identify persisting problem causing symptoms.

35 Claims, 36 Drawing Sheets

U.S. PATENT DOCUMENTS

| | | | |
|---|---|---|---|
| 6,633,835 B1 * | 10/2003 | Moran et al. | 702/190 |
| 6,700,575 B1 * | 3/2004 | Bovarnick et al. | 345/440 |
| 6,751,661 B1 * | 6/2004 | Geddes | 709/223 |
| 6,862,698 B1 * | 3/2005 | Shyu | 709/224 |
| 7,076,400 B2 * | 7/2006 | Dulberg et al. | 702/184 |
| 7,111,053 B1 * | 9/2006 | Black et al. | 709/223 |
| 7,197,546 B1 * | 3/2007 | Bagga et al. | 709/223 |
| 7,237,023 B2 | 6/2007 | Menard et al. | |
| 7,251,584 B1 | 7/2007 | Perazolo et al. | |
| 7,299,277 B1 * | 11/2007 | Moran et al. | 709/224 |
| 7,340,649 B2 | 3/2008 | Angamuthu et al. | |
| 2001/0052006 A1 * | 12/2001 | Barker et al. | 709/223 |
| 2002/0087680 A1 * | 7/2002 | Cerami et al. | 709/223 |
| 2002/0087734 A1 * | 7/2002 | Marshall et al. | 709/310 |
| 2002/0120734 A1 * | 8/2002 | Riosa et al. | 709/224 |
| 2002/0165727 A1 * | 11/2002 | Greene et al. | 707/1 |
| 2002/0184300 A1 * | 12/2002 | Schmeling et al. | 709/223 |
| 2004/0078683 A1 | 4/2004 | Buia et al. | |
| 2008/0183704 A1 | 7/2008 | Miller et al. | |

OTHER PUBLICATIONS

Sutter, M.T. et al. "Designing Expert Systems for Real-Time Diagnosis of Self-Correcting Networks" IEEE Network. Sep. 1988.*

"HP OpenView Correlation Composer's Guide," Hewlett-Packard Company, pp. 1-210, Jan. 2003.

"HP OpenView event correlation services (ECS) for network node manager and operations," product brief, Hewlett-Packard, Feb. 2003, 2 pages.

"Segmented Response Time: the Key eBusiness Infrastructure Performance Indicator", Altaworks Corporation, 2001, 15 pages.

Appleby et al., "Yemanja-A Layered Event Correlation Engine for Multi-domain Server Farms," 2001unknown, 17 pages.

Cockcroft, "Advanced Monitoring and Tuning", Sun Microsystems, Oct. 1995, pp. 1-12.

Cockcroft, "System Performance Monitoring", Sun Microsystems, Sep. 1995, pp. 1-12.

Gruschke et al., "Integrated Event Management: Event Correlation Using Dependency Graphs", DSOM '98, 12 pages.

Hoard, "Delivering the Promise of Availability", CIO White Paper Library, Candisco Inc., 13 pages., downloaded Mar. 29, 2002.

PCT International Search Report, re counterpart PCT Application No. PCT/US03/11354, dated Sept. 8, 2004.

Poltrock, et al, "Graphic Interfaces for Knowledge-Based System Development," CHI'86 Proceedings, Microelectronics and Computer Technology Corporation, Austin TX, pp. 9-15, Apr. 1986.

ProactiveNet Meta API, "Unleash the Power of Meta!", Rev 1.2, Proactive Net, Inc., Alviso, CA, pp. 1-13, Feb. 5, 2002.

ProactiveNet Monitors, Proactive Net, Inc., Alviso, CA, 2002, 4 pages.

Remedy User Group Conference RUG 2001, Remedy Corporation, Rxpress, vol. 9, Issue 2, Summer 2001, 28 pages.

Roy et al. "A Modeling Approach to Root-cause Analysis, New Product Review", Patrol for Diagnostic Management, BMC Software, Inc., downloaded Mar. 14, 2003, pp. 1- 5.

"Enabling Business Service Management™". White Paper, Managed Objects, Inc., presumably 2001, pp. 1-11.

"Operations Performance Assurance", Statistical Root Cause Analysis of Web Transaction Performance, www.proactivenet.com, ProactiveNet, Inc., Alviso, CA., presumably 2001, 12 pages.

"Covasoft Introduces CoveOne Knowledge Pack for IBM WebSphere", Jul. 3, 2002, www.covasoft.com, 1 page.

"Gensym to Debut Software for Advancing Intelligent Service Management At SUPERCOMM'99," Business Wire, Jun. 3, 1999, Cambridge, Mass., pp. 1-2.

Hulme, George V., "Costly Management", Information Week, Nov. 6, 2000, pp. 1-5.

"Integrity- Equipping Your Network for the Demands of Continuous Service Ability," gensym, Gensym Corporation, Dec. 2001, 4 pages.

Warpenburg, Michael R. et al., "Patrol Root Cause Analysis - A New Standard of Event Automation in an Enterprise Computing Environment", Jun. 30, 1999, pp. 1-7.

U.S. Appl. No. 10/412,639, Office Action, mailed Nov. 30, 2005.

U.S. Appl. No. 10/412,639, Office Action, mailed May 22, 2006.

* cited by examiner

FIG. 20

Netscape http://localhost:8080/instasolv/jsp/index.html

Search

Instasolv

Rule Management: Add New Rule

Back to MAIN

Step 1: SET RULE NAME

Choose a Rule Pack
default

Type in the Rule Name
HeapRule

Type in a Descriptor for the Rule
Check heap if usage is greater than 60%

Type in and Submit both, a Rule name and descriptor, which will be displayed here.

SUBMIT

Step 1
Enter Rule Name & Description

Step 2
Configure Situation(s)

Step 3
Configure Condition(s)

Step 4
Configure Action(s)

▯ indicates Step that is current.

Document: Done (1.2 secs)

FIG. 21

METHOD AND SYSTEM FOR MANAGING COMPUTER SYSTEMS

CROSS-REFERENCE TO RELATED APPLICATIONS

This application is a continuation of U.S. patent application Ser. No. 10/412,639, filed Apr. 10, 2003 now abandoned, and entitled "METHOD AND SYSTEM FOR MANAGING COMPUTER SYSTEMS," which is hereby incorporated by reference herein, which is turn claims the priority benefit of: (i) U.S. Provisional Patent Application No. 60/371,659, filed Apr. 10, 2002, and entitled "METHOD AND SYSTEM FOR MANAGING COMPUTER SYSTEMS," which is hereby incorporated by reference herein; and (ii) U.S. Provisional Patent Application No. 60/431,551, filed Dec. 5, 2002, and entitled "METHOD AND SYSTEM FOR MANAGING COMPUTER SYSTEMS," which is hereby incorporated by reference herein.

BACKGROUND OF THE INVENTION

1. Field of the Invention

The present invention relates to computer systems and, more particularly, to management of computer systems.

2. Description of the Related Art

Today's computer systems, namely enterprise computer systems, make use of a wide range of products. The products are often applications, such as operating systems, application servers, database servers, JAVA Virtual Machines, etc. These computer systems often suffer from network and system-related problems. Unfortunately, given the complex mixture of products concurrently used by such computer systems, there is great difficultly in identifying and isolating of application-related problems. Typically, when a problem occurs on a computer system, it must first be isolated to a particular computer system out of many different computer systems or to the network interconnect among these systems and also to a particular application out of many different applications used by the computer system. However, conventionally speaking, isolating the problem is difficult, time consuming and requires a team of application experts with different domain expertise. These experts are expensive, and the resulting down time of computer systems is very expensive to enterprises.

Although management solutions have been developed, such solutions are dedicated to particular customers and/or specific products. Monitoring systems are able to provide monitoring for events, but offer no meaningful management of non-catastrophic problems and prevention of catastrophic problems. Hence, conventional managing and monitoring solutions are dedicated approaches that are not generally usable across different computer systems using combinations of products.

Thus, there is a need for improved management systems that are able to efficiently manage computer systems over a wide range of products.

SUMMARY OF THE INVENTION

Broadly speaking, the invention relates to a management system for a computer system. The computer system operates or includes various products (e.g., software products) that can be managed in a management system or collectively by a group of management systems. Typically, the management system operates on a computer separate from the computer system being managed. The management system can make use of a knowledge base of causing symptoms for previously observed problems at other sites or computer systems. In other words, the knowledge base can built from and shared by different users across different products to leverage knowledge that is otherwise disparate. The knowledge base typically grows over time. The management system can use its ability to request information from the computer system being managed together with the knowledge base to infer a problem root cause in the computer system being managed. The computer system being managed can also request the management system to process its knowledge base for possible problem cause analysis. The management system can also continually identify persisting problem causing symptoms.

The invention can be implemented in numerous ways including, as a method, system, apparatus, and computer readable medium. Several embodiments of the invention are discussed below.

As a management system for a computer system, one embodiment of the invention includes at least: a plurality of agents residing within managed nodes of a plurality of different products used within the computer system, and a manager for said management system. The manager is operable across the different products.

As a method for managing an enterprise computer system, one embodiment of the invention includes at least the acts of: receiving a fact pertaining to a condition of one of a plurality of different products that are operating in the enterprise computer system; asserting the fact with respect to an inference engine, the inference engine using rules based on facts; retrieving updated facts from the inference engine from those of the rules that are dependent on the fact that has been asserted; and performing an action in view of the updated facts.

As a method for isolating a root cause of a software problem in an enterprise computer system supporting a plurality of software products, one embodiment of the invention includes at least the acts of: forming a knowledge base from causing symptoms and experienced problems provided by a disparate group of contributors; and examining the knowledge base with respect to the software problem to isolate the cause of the software problem to one of the software products.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 20-29 are screen shots of a representative Graphical User Interface (GUI) suitable for use with one embodiment of the present invention.

DETAILED DESCRIPTION OF THE INVENTION

The invention pertains to a management system for a computer system (e.g., an enterprise computer system). The computer system operates or includes various products (e.g., software products) that can be managed in a management system or collectively by a group of management systems. Typically, the management system operates on a computer separate from the computer system being managed. The management system can make use of a knowledge base of causing symptoms for previously observed problems at other sites or computer systems. In other words, the knowledge base can built from and shared by different users across different products to leverage knowledge that is otherwise disparate. The knowledge base typically grows over time. The management system can use its ability to request information from the computer system being managed together with the knowledge base to infer a problem root cause in the computer system being managed. The computer system being managed can also request the management system to process its knowledge base for possible problem cause analysis. The management system can also continually identify persisting problem causing symptoms.

Embodiments of the invention are discussed below with reference to FIGS. 1-29. However, those skilled in the art will readily appreciate that the detailed description given herein with respect to these figures is for explanatory purposes as the invention extends beyond these limited embodiments.

Figure 1:
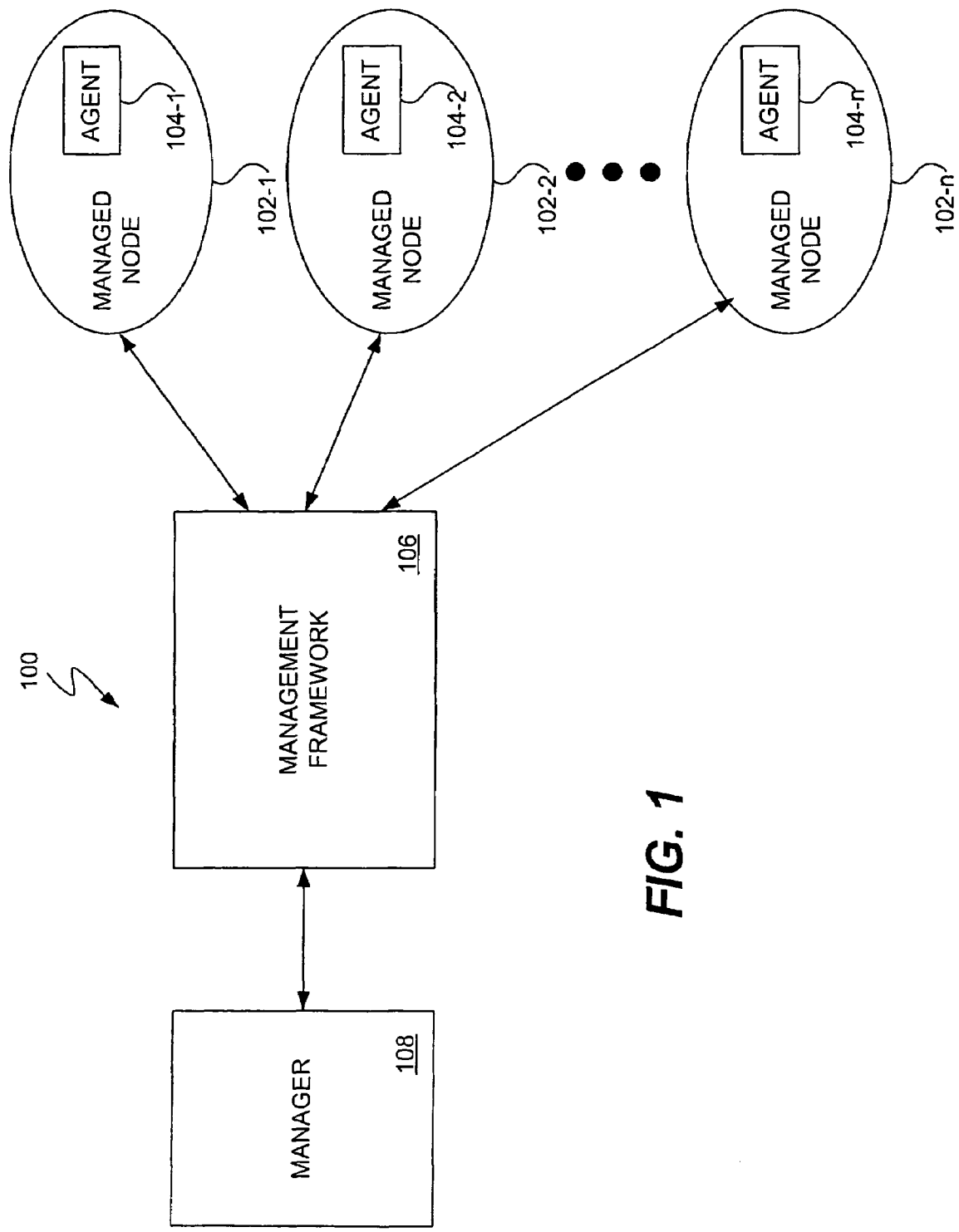
FIG. 1 is a block diagram of a management system according to one embodiment of the invention.

FIG. 1 is a block diagram of a management system 100 according to one embodiment of the invention. The management system 100 serves to manage a plurality of managed nodes 102-1, 102-2, . . . , 102-n. Each of the managed nodes 102-1, 102-2, . . . , 102-n respectively includes an agent 104-1, 104-2, . . . , 104-n. These agents 104 serve to monitor and manage products at the managed nodes 102. In one implementation, the agents 104 are stand alone processes operating in their own process space. In another implementation, the agents 104 are specific to particular products being managed and reside at least partially within the process space of the products being managed. The agents 104 can monitor and collect data pertaining to the products. Since the products can utilize an operating system or network coupled to the managed nodes, the agents 104 are also able to collect state information pertaining to the operating system or the network. In still another implementation, the agents 104 are an embodiment of Simple Network Management Protocol (SNMP) agents available from third-parties or system vendors.

The agents 104 can be controlled to monitor specific information (e.g., resources) with respect to user-configurable specifics (e.g., attributes). The information (e.g., resources) being monitored can have zero or more layers or depths of specifics (e.g., attributes). The monitoring of the information can be dynamically on-demand or periodically performed. The information being monitored can be focused or limited to certain details as determined by the user-configurable specifics (e.g., attributes). For example, the information being monitored can be focused or limited by certain levels/depths.

Optionally, the agents 104 can also be capable of performing certain statistical analysis on the data collected at the managed nodes. For example, the statistical analysis on the data might pertain to running average, standard deviation, or historical maximum and minimum.

The management system 100 also includes a management framework 106. The management framework 106 facilitates communications between the agents 104 for the managed nodes 102 and the manager 108. For example, different agents 104 can utilize different protocols (namely, management protocols) to exchange information with the management framework 106.

The management system 100 also includes a manager 108. The manager 108 serves to manage the management system 100. Consequently, the manager 108 can provide cross-products, cross-systems and multi-systems management in a centralized manner, such as for an enterprise network environment having multiple products or applications which serve different types of requests. In an enterprise network environment, the manager 108 has the ability to manage the various systems therein and their products and/or applications through a single entity. Geographically, these systems and products and/or applications can be centrally located or distributed locally or remotely (even globally).

Figure 2:
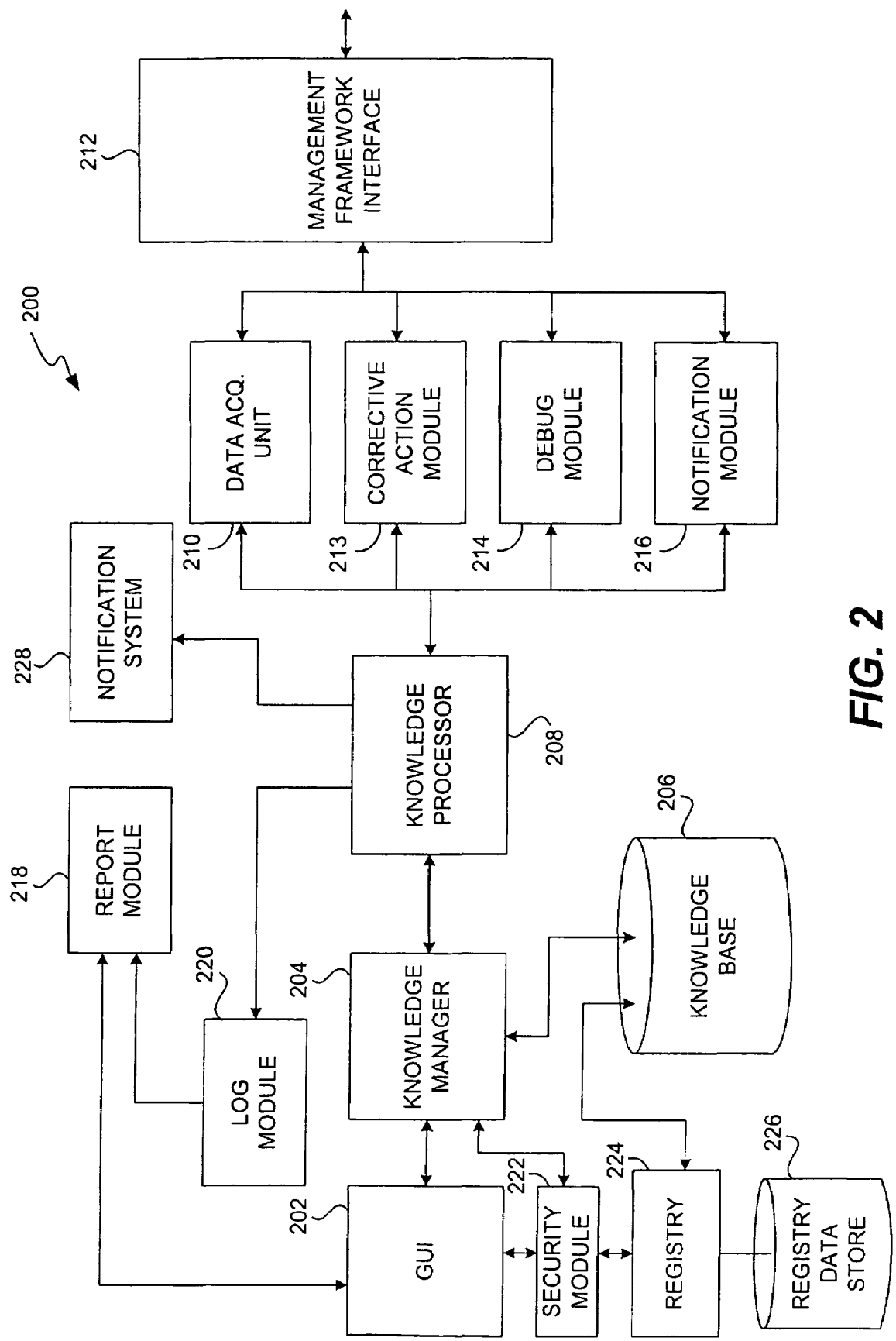
FIG. 2 is a block diagram of a manager for a management system according to one embodiment of the invention.

FIG. 2 is a block diagram of a manager 200 for a management system according to one embodiment of the invention. For example, the manager 200 illustrated in FIG. 2 can pertain to the manager 108 illustrated in FIG. 1.

The manager 200 includes a Graphical User Interface (GUI) 202 that allows a user (e.g., an administrator) to interact with the manager 200 to provide user input. The user input can pertain to rules, resources or situations. In addition, the user input with the GUI 202 can pertain to administrative or configuration functions for the manager 200 or output information (e.g., reports, notifications, etc.) from the manager 200. The input data is supplied from the GUI 202 to a knowledge manager 204. The knowledge manager 204 confirms the validity of the rules, resources or situations and then converts such rules, resources or situations into a format being utilized for storage in a knowledge base 206. In one implementation, the format pertains to meta-data represented as JAVA properties. The knowledge base 206 stores the rules, resources and situations within the database in a compiled code format.

The manager 200 also includes a knowledge processor 208. The knowledge processor 208 interacts with the knowledge manager 204 to process appropriate rules within the knowledge base 206 in view of any relevant situations or resources. In processing the rules, the knowledge processor 208 often requests data from the agents 104 at the managed nodes. Such requests for data are initiated by the knowledge processor 208 and performed by way of a data acquisition unit 210 and a management framework interface 212. The returned data from the agents 104 is returned to the knowledge processor 208 via the data acquisition unit 210 and the management framework interface 212. With such monitored data in hand, the knowledge processor 208 can evaluate the relevant rules. When the rules (evaluated by the knowledge processor 208 in accordance with the monitored data received from the agents 104) indicate that a problem exists, then a variety of different actions can be performed. A corrective action module 213 can be initiated to take corrective action with respect to resources at the particular one or more managed nodes that have been identified as having a problem. Further, if debugging is desired, a debug module 214 can also be activated to interact with the particular managed nodes to capture system data that can be utilized in debugging the particular system problems.

The knowledge processor 208 can periodically, or on a scheduled basis, perform certain of the rules stored within the knowledge base 206. The notification module 216 can also initiate the execution of certain rules when the notification module 216 receives an indication from one of the agents 104 via the management framework interface 212. Typically, the agents 104 would communicate with the notification module 216 using a notification that would specify a management condition that the agent 104 has sent to the manager 200 via the management framework 106.

In addition, the manager 200 also includes a report module 218 that can take the data acquired from the agents 104 as well as the results of the processed rules (including debug data as appropriate) and generate a report for use by the user or administrator. Typically, the report module 218 and its generated reports can be accessed by the user or administrator through the GUI 202. The manager 200 also includes a log module 220 that can be used to store a leg of system conditions. The log of system conditions can be used by the report module 218 to generate reports.

The manager 200 can also include a security module 222, a registry 224 and a registry data store 226. The security module 222 performs user authentication and authorization. Also, to the extent encoding is used, the security module 222 also perform encoding or decoding (e.g., encryption or decryption) of information. The registry 224 and the registry data store 226 serve to serve and store structured information respectively. In one implementation, the registry data store 226 serves as the physical storage of certain resource information, configuration information and compiled knowledge information from the knowledgebase 206.

Still further, the manager 200 can include a notification system 228. The notification system 228 can use any of a variety of different notification techniques to notify the user or administrator that certain system conditions exist. For example, the communication techniques can include electronic mail, a pager message, a voice message or a facsimile.

Once notified, the notified user or administrator can gain access to a report generated by the report module 218.

The debug module 214 is able to be advantageously initiated when certain conditions exist within the system. Such debugging can be referred to as "just-in-time" debugging. This focuses the capture of data for debug purposes to a constrained time period in specific areas of interest such that more relevant data is able to be captured.

Figure 3:
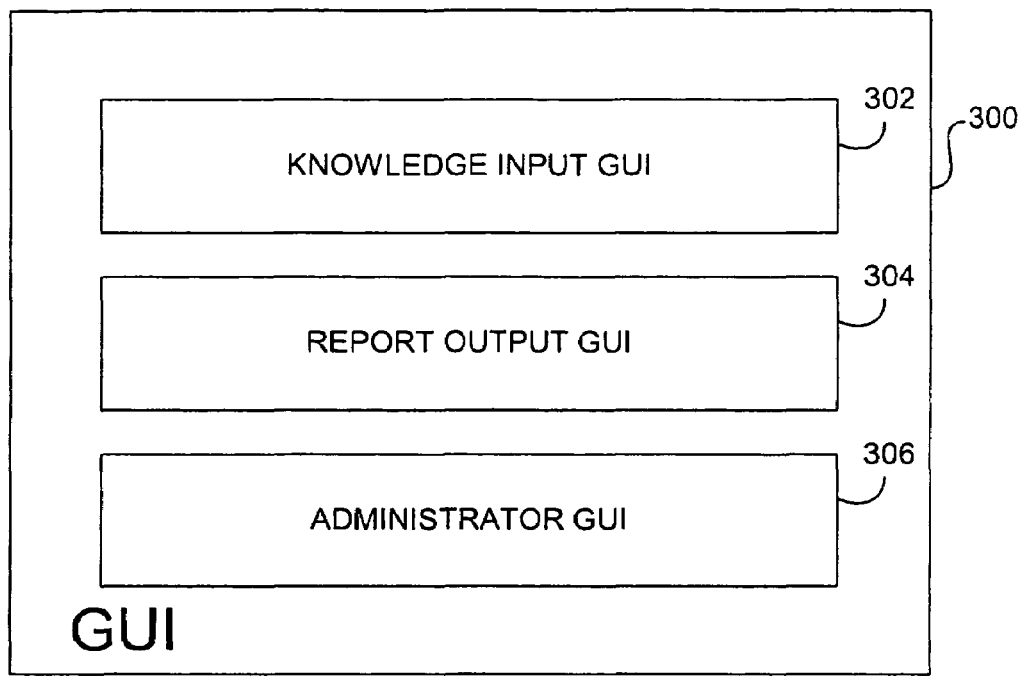
FIG. 3 is a block diagram of a GUI (Graphical User Interface) according to one embodiment of the invention.

FIG. 3 is a block diagram of a GUI 300 according to one embodiment of the invention. The GUI 300 is, for example, suitable for use as the GUI 202 illustrated in FIG. 2.

The GUI 300 includes a knowledge input GUI 302, a report output GUI 304, and an administrator GUI 306. The knowledge input GUI 302 provides a graphical user interface that facilitates interaction between a user (e.g., administrator) and a manager (e.g., the manager 200). Hence, using the knowledge input GUI 302, the user or administrator can enter rules, resources or situations to be utilized by the manager. The report output GUI 304 is a graphical user interface that allows the user to access reports that have been generated by a report module (e.g., the report module 218). Typically, the report output GUI 304 would not only allow initial access to such reports, but would also provide a means for the user to acquire additional detailed information about reported conditions. For example, the report output GUI 304 could enable a user to view a report on chosen criteria such as case ID or a period of time. The administrator GUI 306 can allow the user to configure or utilize the manager. For example, the administrator GUI 306 can allow creation of new or modification to existing users and their access passwords, specific information about managed nodes and agents (including managed-node IP and port, agent name, agent types), electronic mail server and user configuration.

Figure 4:
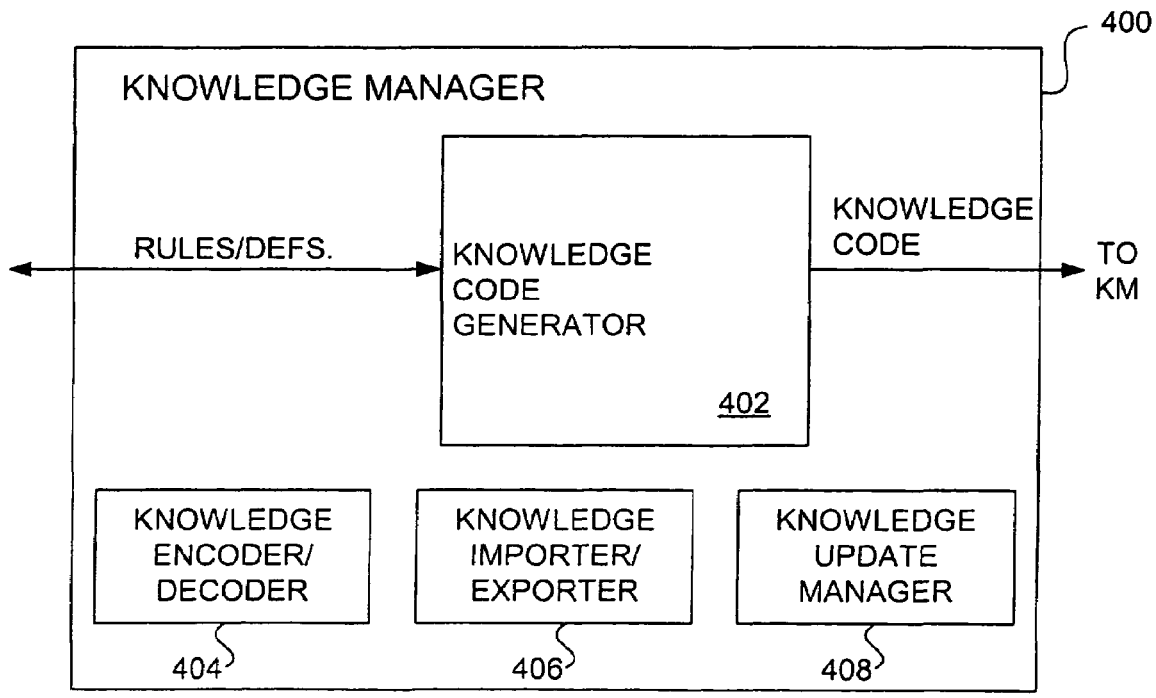
FIG. 4 is a block diagram of a knowledge manager according to one embodiment of the invention.

FIG. 4 is a block diagram of a knowledge manager 400 according to one embodiment of the invention. The knowledge manager 400 is, for example, suitable for use as the knowledge manager 204 illustrated in FIG. 2.

The knowledge manager 400 includes a knowledge code generator 402. In particular, the knowledge code generator 402 receives rules or definitions (namely, definitions for resources or situations) and then generates and outputs knowledge code to a knowledge processor, such as the knowledge processor 208. In one implementation, the knowledge code generator 402 can be considered a compiler, in that the rules or definitions are converted into a data representation suitable for execution. The knowledge code can be a program code or it can be a meta-language. In one implementation, the knowledge code is executable by an inference engine such as JESS. Additional information on JESS is available at "herzberg.ca.sandia.gov/jess" as an example.

The knowledge manager 400 also includes a knowledge encoder/decoder 404, a knowledge importer/exporter 406 and a knowledge update manager 408. The knowledge encoder/decoder 404 can perform encoding when storing knowledge to the knowledge base 206 or decoding when retrieving knowledge from the knowledge base 206. The knowledge importer/exporter 406 can import knowledge from another knowledge base and can export knowledge to another knowledge base. In general, the knowledge update manager 408 serves to manually or automatically update the knowledge base 206 with additional sources of knowledge that are available and suitable. In one embodiment, the knowledge update manager 408 operates to manage the general coherency of the knowledge base 206 with respect to a central knowledge base. Typically, the knowledge base 206 stored and utilized by the knowledge manager 400 is only a relevant portion of the central knowledge base for the environment that the knowledge manager 400 operates.

Figure 5A:
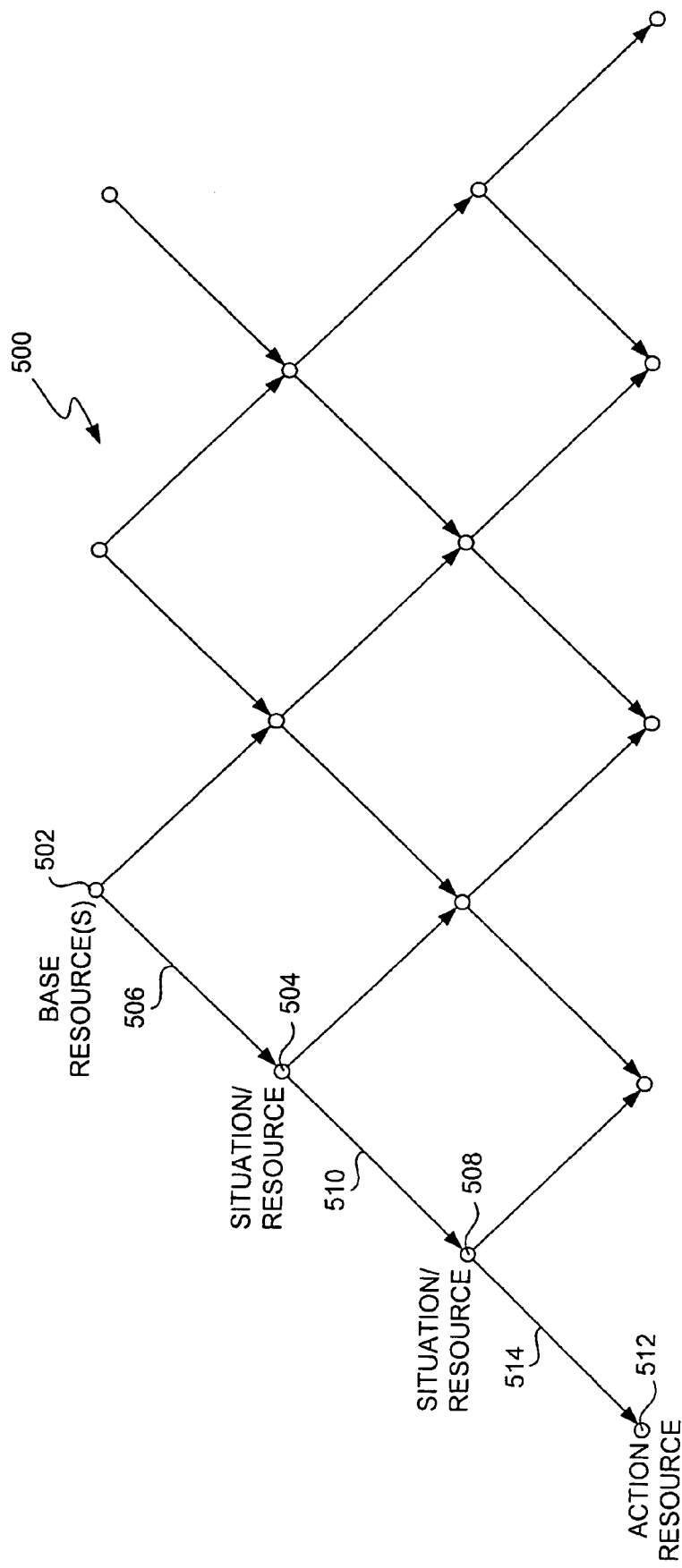
FIG. 5A is a diagram of a directed graph representing a knowledge base.

FIG. 5A is a diagram of a directed graph 500 representing a knowledge base. The knowledge base represented by the directed graph 500 is, for example, suitable for use as the knowledge base 206 illustrated in FIG. 2. The directed graph 500 represents a pictorial view of the knowledge code resulting from rules, situations and resources.

The directed graph 500 is typically structured to include base resources at the top of the directed graph 500, situations/resources in a middle region of the directed graph 500, and actions (action resources) at the bottom (or leaf nodes) of the directed graph 500. In particular, node 502 pertains to a base resource or resources and node 504 pertains to situation and/or resource. A relationship 506 between the nodes 502 and 504 is determined by the rule being represented by the directional arrow between the nodes 502 and 504. The situation/resource at node 504 in turn relates to another situation/resource at node 508. A relationship 510 relates the nodes 504 and 508, namely, the relationship 510 is determined by the rule represented by the directional arrow between the nodes 504 and 508. The situations/resources at nodes 504 and 508 together with the relationship 510 pertain to another rule. The situation/resource at node 508 is further related to an action resource at node 512. A relationship 514 between the situation/resource at node 508 and the action resource at node 512 is determined by still another rule, namely, an action rule.

The knowledge base represented by the directed graph 500 is flexible and extendible given the hierarchical architecture of the directed graph 500. Hence, the knowledge base is able to grow over time to add capabilities without negatively affecting previously existing knowledge within the knowledge base. The knowledge base is also able to be divided or partitioned for different users, applications or service plans. In effect, as the knowledge base grows, the directed graph 500 representation grows to add more nodes, such nodes representing situations or resources as well as relationships (i.e., rules) between nodes.

Figure 5B:
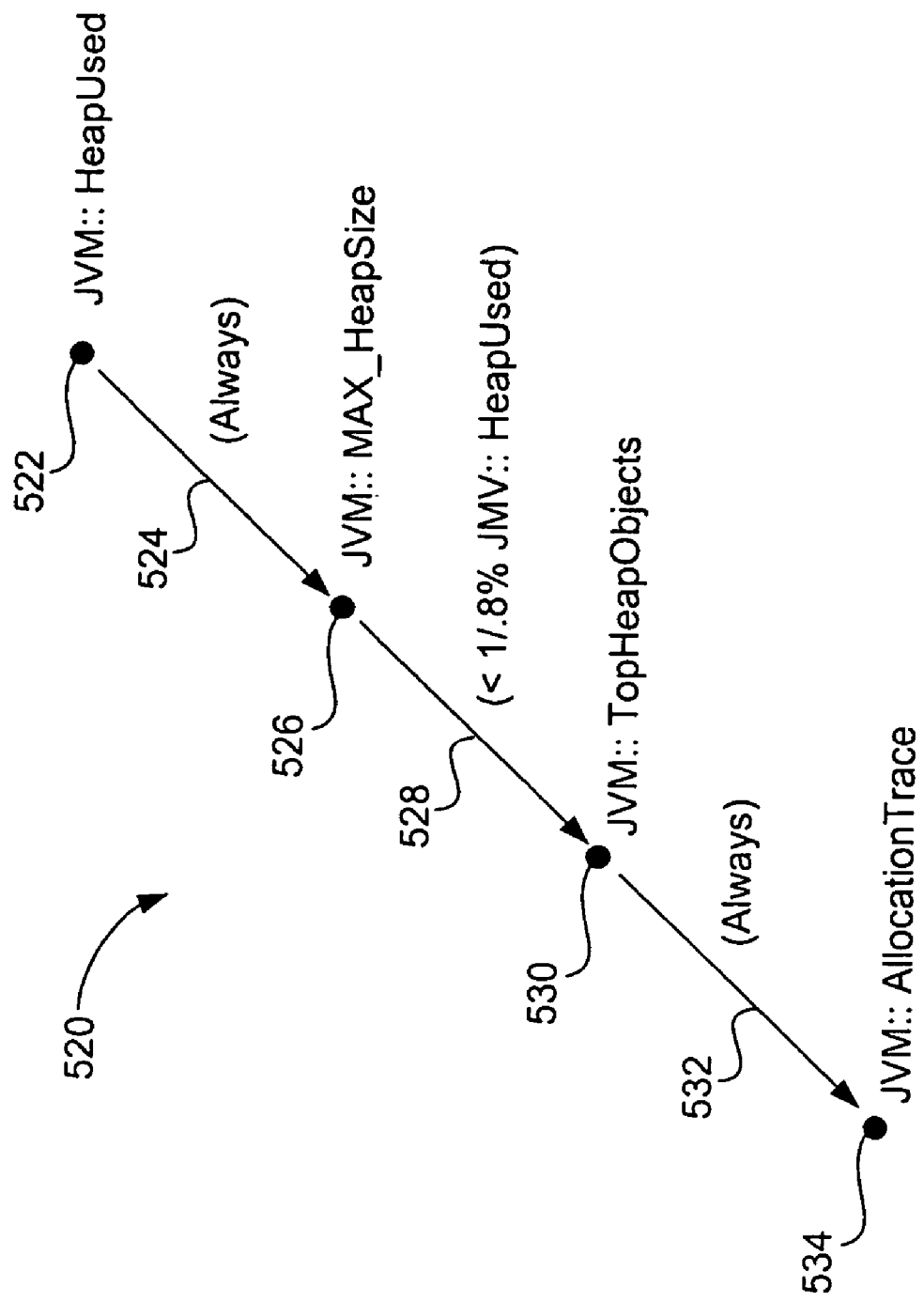
FIG. 5B represents a small portion of knowledge provided in a segment of a directed graph (e.g., directed graph).

FIG. 5B represents a small portion of knowledge provided in a segment 520 of a directed graph (e.g., directed graph 500). The segment 520 includes nodes 522, 526, 530 and 534, and relationships 524, 528 and 532. The node 522 pertains to a resource, namely, heap size of Java Virtual Machine (JVM) in use. The relationship 524 indicates that when the node 522 is triggered, the node 526 is triggered. The node 526 pertains to a resource, namely, maximum heap size of JVM. The relationship 528 evaluates whether the maximum heap size for JVM is less than 1/0.8 percent the heap size for JVM. When the relationship 528 is true, then the node 530 is triggered to acquire a resource, namely, TopHeapObjects for JVM, which is a debugging resource that obtains the information about the objects that are consuming the most amount of JVM heap. The specifics of this resource include the resource consumption selected by cumulative size or the number of objects, the count of the distinct objects, the selection of objects by JAVA classes they belong to are described by the attributes of the resource. The relationship 532 then always causes the node 534 to invoke a resource action, namely, initiating an allocation trace for JVM. The specifics of this resource selectable by its attributes can include but not limited to the classes of objects to trace, the time-period for tracing, and the depth of stack to which to limit every trace.

Figure 5C:
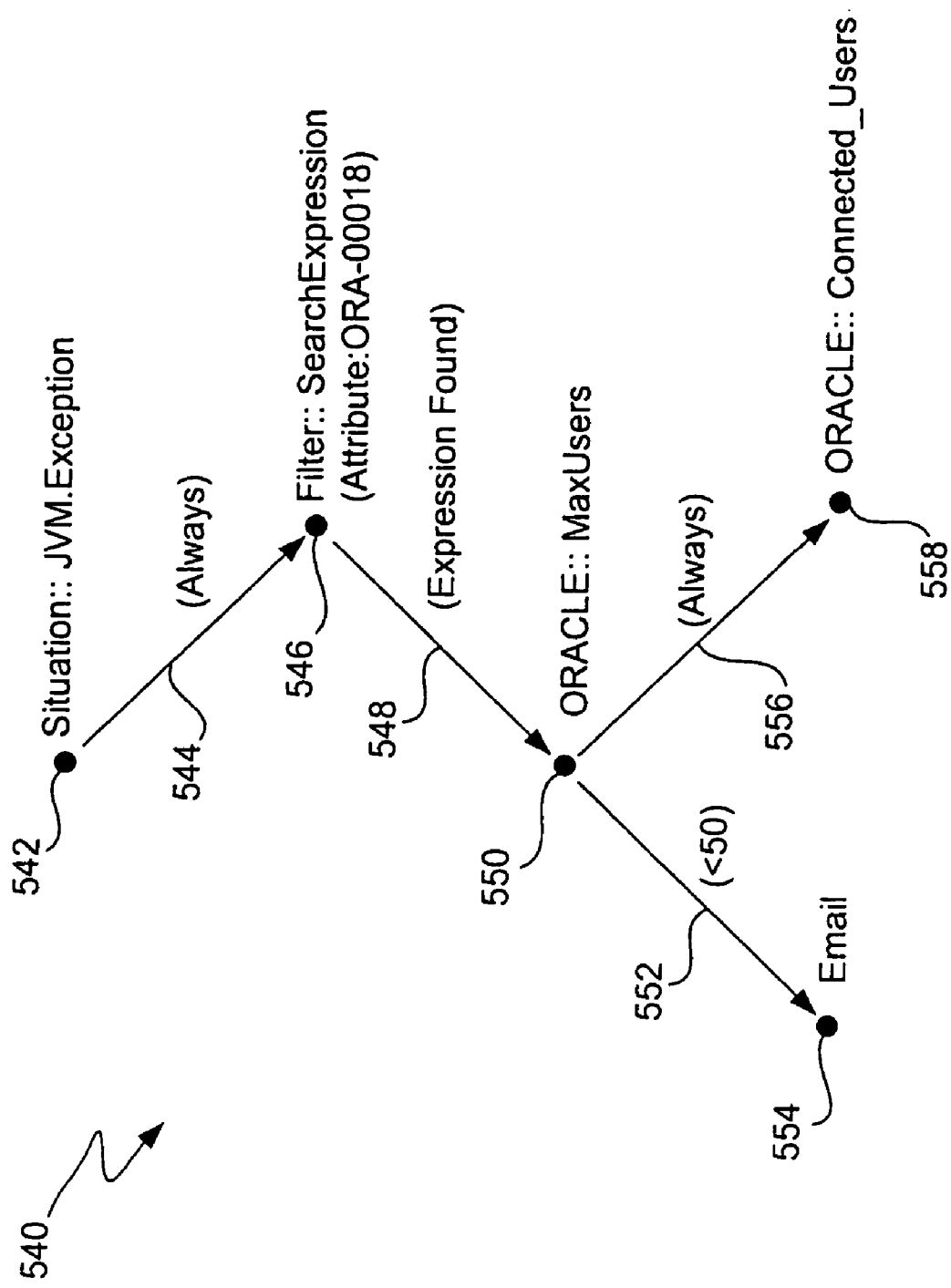
FIG. 5C represents a small portion of knowledge provided in a segment a directed graph (e.g., directed graph).

FIG. 5C represents a small portion of knowledge provided in a segment 540 of a directed graph (e.g., directed graph 500). The segment 540 includes nodes 542, 546, 550, 554 and 558, and relationships 544, 548, 552 and 556. The node 542 pertains to a situation, namely, a JVM exception. The relationship 544 causes the node 546 to invoke a filter operation when the situation at node 542 is present. The filter operation at node 546 is a search expression that searches the JVM exception resource information received from agent 104 for an attribute "ORA-00018" which represents a particular problem with Oracle database, namely, the Oracle database running out of database connections for the managed JAVA application to use. When the search expression is found, the relationship 548 causes the node 550 to trigger. At node 550, a resource for maximum users configured for the Oracle database being used by the managed JAVA application is obtained. Then, the relationship 552 determines whether the maximum users for the Oracle product is less than fifty (50) and, if so, the node 554 invokes an action, namely, an email notification is sent. In addition, the relationship 556 always triggers the node 558 to acquire a resource pertaining to the number of connected users the relevant Oracle database. The two rules, one rule represented by resources 542, 546, 550, 558 and the relationships 544, 548, 556, and the second rule represented by the resources 550, 554 and the relationship 552 are two distinct rules defined using GUI 202 at different times and possibly by different users and without needing to know about the existence of the second rule while defining the first one rule and vice versa. The knowledgebase automatically links or chains these rules through the commonality of the resources (e.g., Oracle maximum configured users resource 550 in the this example).

Figure 6:
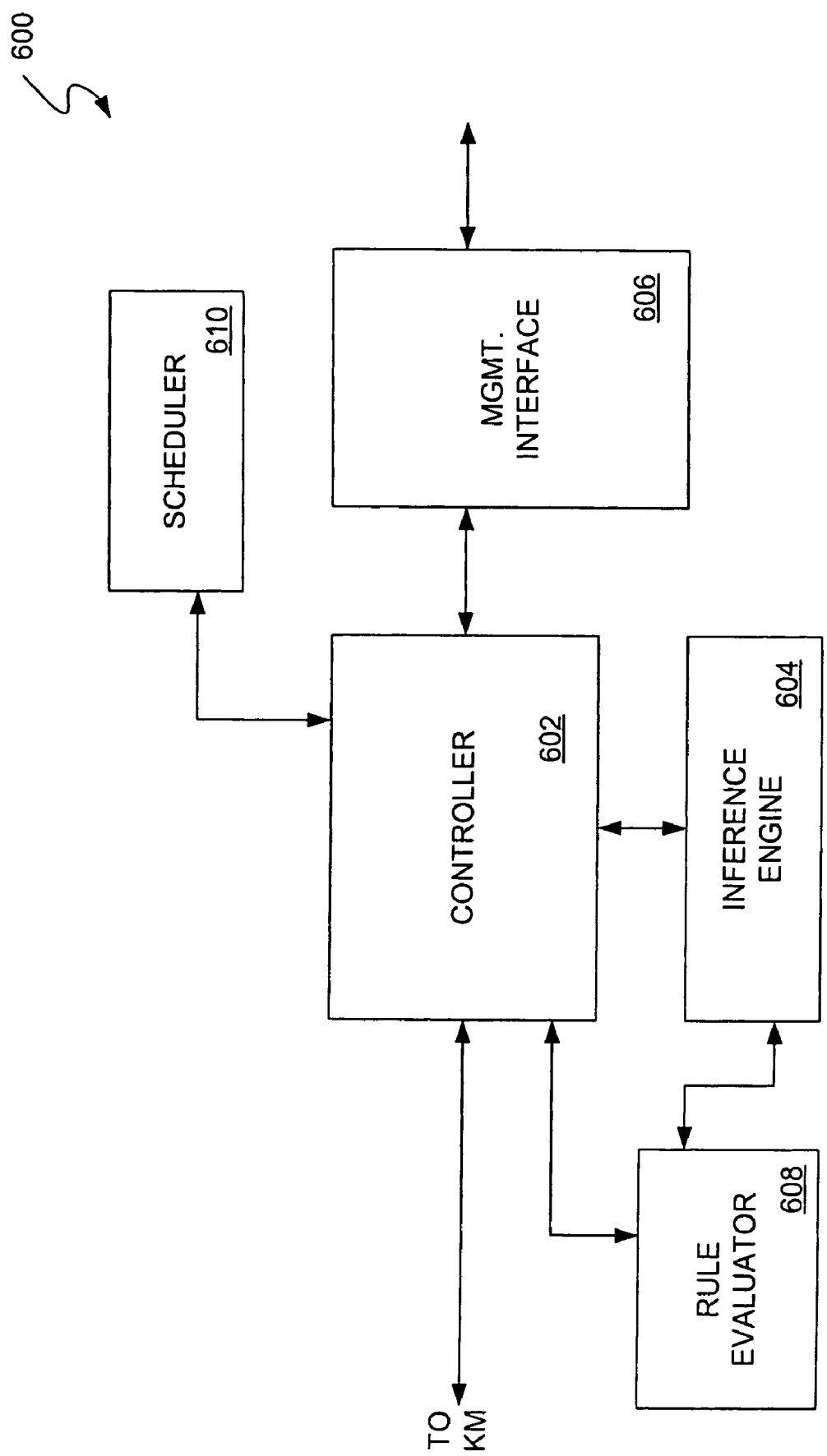
FIG. 6 is a block diagram of a knowledge processor according to one embodiment of the invention.

FIG. 6 is a block diagram of a knowledge processor 600 according to one embodiment of the invention. The knowledge processor 600 is, for example, suitable for use as the knowledge processor 208 for the manager 200 illustrated in FIG. 2.

The knowledge processor 600 includes a controller 602 that couples to a knowledge manager (e.g., the knowledge manager 204). The controller 602 receives the knowledge code from the knowledge manager and directs it to an inference engine 604 to process the knowledge code. In one embodiment, the knowledge code is provided in an inference language such that the inference engine 604 is able to execute the knowledge code.

In executing the knowledge code, the inference engine 604 will typically inform the controller 602 of the particular data to be retrieved from the managed nodes via the agents and the management framework interface. In this regard, the controller 602 will request the data via a management interface 606 to a management framework. The returned data from the managed nodes is then returned to the controller 602 via the management interface 606. Alternatively, in executing the knowledge code, exceptions (i.e., unexpected events) can be generated at the managed nodes and pushed through the management interface 606 to the controller 602. In either case, the controller 602 then forwards the returned data to the inference engine 604. At this point, the inference engine 604 can continue to process the knowledge code (e.g., rules). The inference engine 604 may utilize a rule evaluator 608 to assist with evaluating the relationships or rules defined by the knowledge code. The rule evaluator 608 can perform not only the relationship checking for rules but also data parsing. Once the knowledge code has been executed, the inference engine 604 can inform the controller 602 to have various operations performed. These operations can include capturing of additional data from the managed nodes, initiating debug operations, initiating corrective actions, initiating logging of information, or sending of notifications.

The knowledge processor 600 also can include a scheduler 610. The scheduler 610 can be utilized by the inference engine 604 or the controller 602 to schedule a future action, such as the retrieval of data from the managed nodes.

Figure 7:
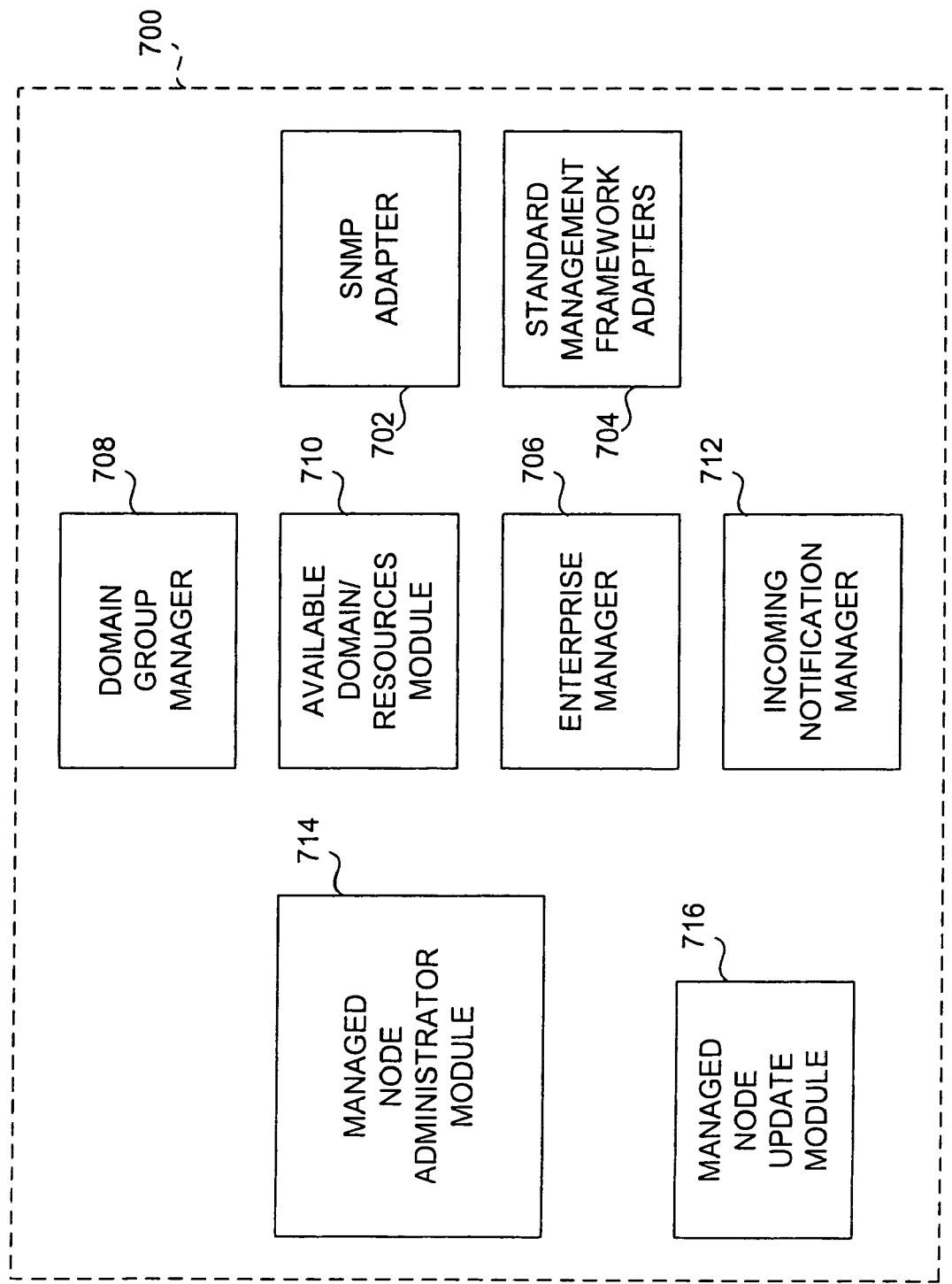
FIG. 7 is a block diagram of a management framework interface according to one embodiment of the invention.

FIG. 7 is a block diagram of a management framework interface 700 according to one embodiment of the invention. The management framework interface 700 is, for example, suitable for use as the management framework interface 212 illustrated in FIG. 2.

The management framework interface 700 includes a SNMP adapter 702 and a standard management framework adapter 704. The SNMP adapter 702 allows the management framework interface 700 to communicate using the SNMP protocol. The standard management framework adapter 704 allows the management framework interface 700 to communicate with any other communication protocols that might be utilized by standard management frameworks, such as other product managers and the like. The management framework interface 700 also includes an enterprise manager 706, a domain group manager 708, and an available domain/resources module 710. During startup of the management framework interface 700 (which is typically associated with an enterprise), the enterprise manager 706 will identify all groups within the enterprise. Then, the domain group manager 708 will operate to identify all management nodes within each of the groups. Thereafter, the available domain/resources module 710 will identify all domains and resources associated with each of the identified domains. Hence, the domains and resources for a given enterprise are able to be identified at startup so that the other components of a manager (e.g., the manager 200) are able to make use of the available domains and resources within the enterprise. For example, a GUI can have knowledge of such resources and domains for improved user interaction with the manager, and the knowledge processor can understand which rules within the knowledge base 206 are pertinent to the enterprise.

The management framework interface 700 also includes an incoming notification manager 712. The incoming notification manager 712 receives notifications from the agents within managed nodes. These notifications can pertain to events that have been monitored by the agents, such as a system crash or the presence of a new resource. More generally, these notifications can pertain to changes to monitored data at the managed nodes by the agents.

The management framework interface 700 also includes a managed node administrator module 714. The managed node administrator module 714 allows a user or administrator to interact with the management framework interface 700 to alter nodes or domains within the enterprise, such as by adding new nodes or domains, updating domains, reloading domains, etc.

Still further, the management framework interface 700 can also include a managed node update module 716. The managed node update module 716 can discover managed nodes and thus permits a manager to recognize and receive status (e.g., active/inactive) of the managed nodes.

Figure 8:
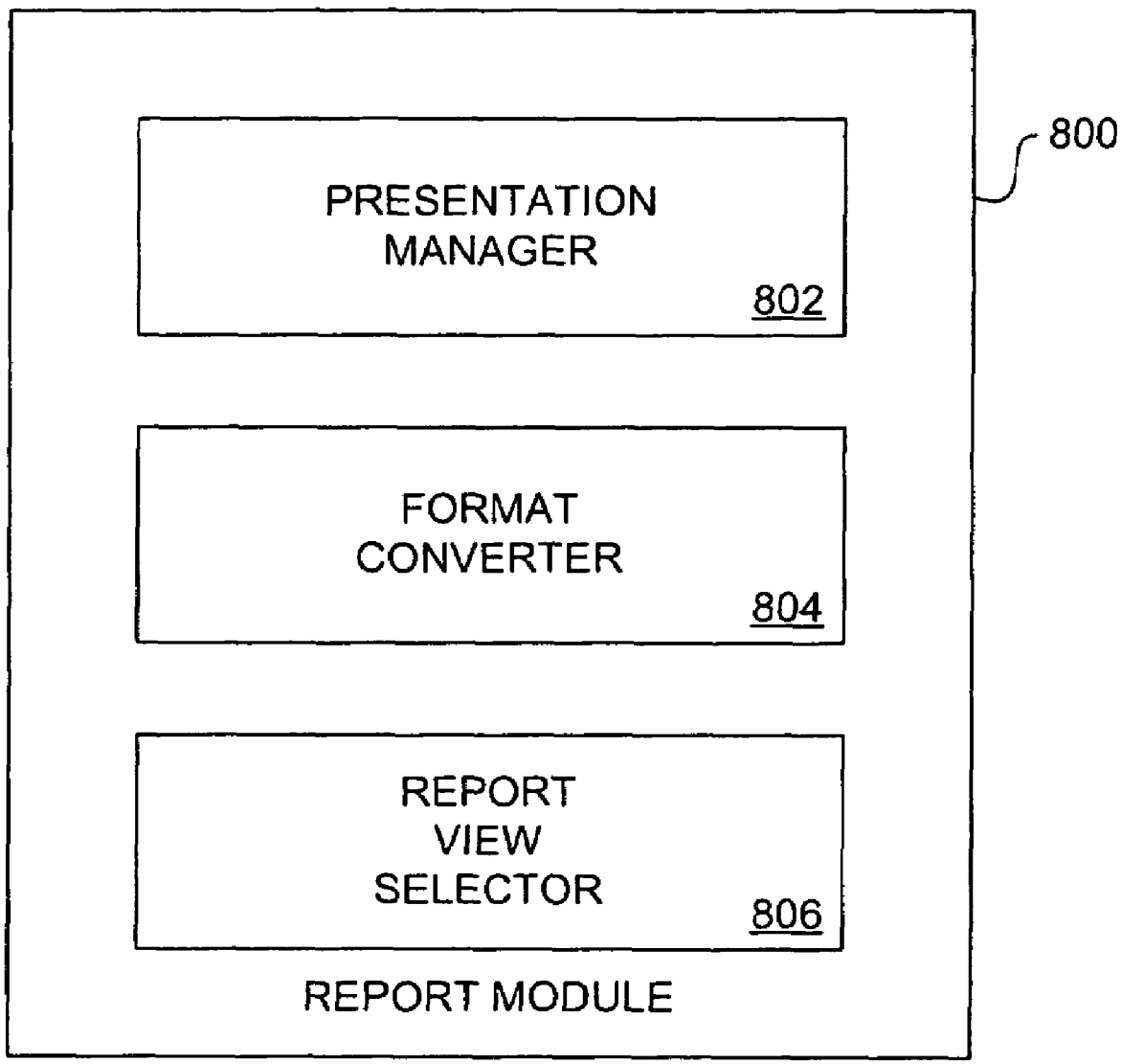
FIG. 8 is a block diagram of a report module according to one embodiment of the invention.

FIG. 8 is a block diagram of a report module 800 according to one embodiment of the invention. The report module 800 is, for example, suitable for use as the report module 218 illustrated in FIG. 2.

The report module 800 includes a presentation manager 802, a format converter 804 and a report view selector 806. The presentation manager 802 operates to process the raw report data provided by a log module (e.g., log module 220) in order to present an easily understood, richly formatted report. Such a report might include associated graphical components that a user can interact with using a GUI (e.g., GUI 202). Examples of graphical components for use with such reports are buttons, pull-down lists, etc. The format converter 804 can convert the raw report data into a format suitable for printing and display. The report view selector 806 allows viewing of partial or complete log data/raw report data in different ways as selected using a GUI. These views can, for example, includes one or more of the following types of reports: (1) Report Managed nodes wise—show report for the selected managed node/process identifier only; (2) Report time wise—show report for the last xyz hours (time desired by the user), with the user having the option of choosing the managed node he wants to view; (3) Report Rule wise—show report for the selected rule that might be applicable for number of JVM instances; (4) Report Rule pack wise—show report for all the rules fired under a particular rule pack; (5) Report Last Fired Rules wise—show report for rules fired after last re-start of the inference engine; (6) Report Rule Fired Frequency wise—show report for rules fired as per selected fired frequency (e.g., useful to get recurrence pattern of event occurrence); (7) Report Domain wise—show report pertaining to a particular domain (e.g., if a rule is composed of multiple domains, in that case this report can show the rules including the selected domain. e.g., JVM); (8) Report Resource wise—show report for all rules including a particular resource under the domain, e.g.,—jvm_Exception); (9) Report filter wise—show report pertaining to rules having similar filter conditions; (10) Report Day wise—show report for all events happened in a day; (11) Report Refreshed Values wise—show next refreshed state of the same report and highlights changed/added records; (12) Report Case ID wise—show the report based on problem case identifier (id); and (13) Customized Structure reports—allow user to select a combination of the above or provide a report filter of their own.

Figure 9A:
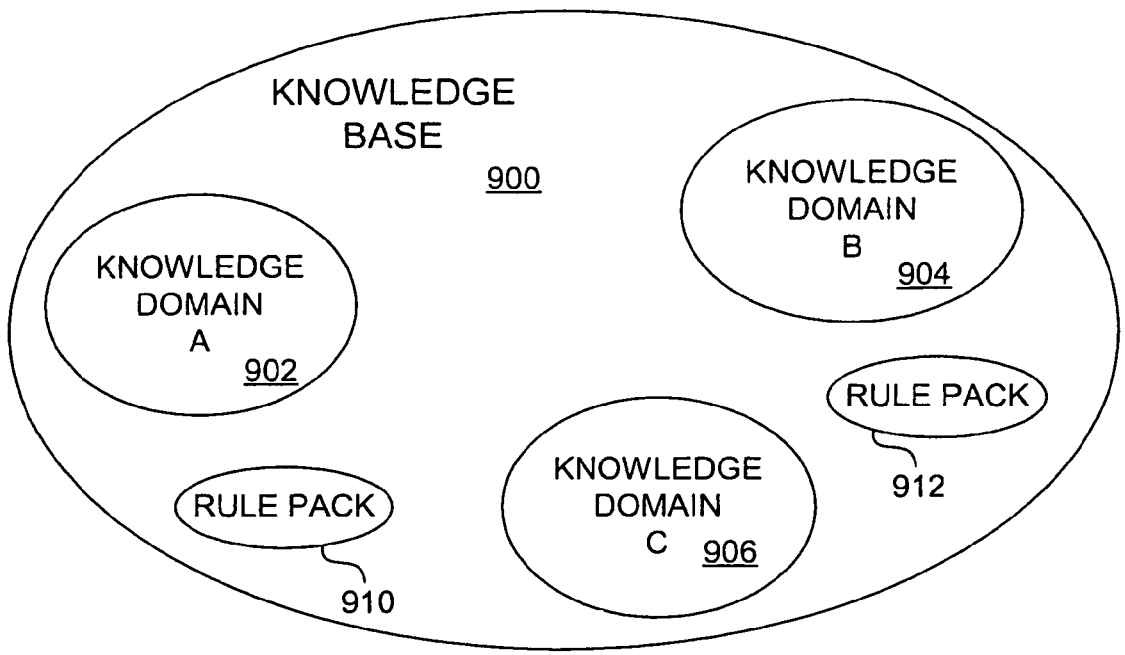
FIG. 9A is a diagram illustrating a knowledge base according to one embodiment of the invention.

FIG. 9A is a diagram illustrating a knowledge base 900 according to one embodiment of the invention. The knowledge base 900 is, for example, suitable for use as the knowledge base 206 illustrated in FIG. 2 or the knowledge base 500 illustrated in FIG. 5A. The architecture for the knowledge base 900 renders the knowledge base 900 well-suited to be managed, deployed and scaled. The knowledge base 900 typically resides within a manager, such as the manager 200 illustrated in FIG. 2. However, the knowledge base 900 can also be distributed between a manager and managed nodes, such that the processing load can be likewise distributed.

The knowledge base 900 includes one or more knowledge domains and one or more rule packs. In particular, the knowledge base 900 illustrated in FIG. 9A includes knowledge domain A 902, knowledge domain B 904 and knowledge domain C 906. Through use of the rule packs, these multiple knowledge domains 902, 904, and 906 can be linked together so as to effectively operate to concurrently cooperate with one another. A particular knowledge domain is a software representation of know-how pertaining to a specific field (or domain). The knowledge domains can be physical domains and/or virtual domains. A physical domain often pertains to a particular managed product. A virtual domain can pertain to a defined set of resources defined by a user to achieve effective manageability.

The knowledge base 900 also includes rule packs 910 and 912. These rule packs (or knowledge rule packs) are collections of rules (i.e., relationships between different kinds of resources/situations). The purpose of the rule packs is to collect the rules such that management modification and tracking of knowledge is made easier. By separating knowledge into domains and rule packs, each knowledge component can be individually tested as well as tested together with other knowledge components. In other words, each domain or rule pack is a logically separate piece of knowledge which can be installed and uninstalled as desired.

Figure 9B:
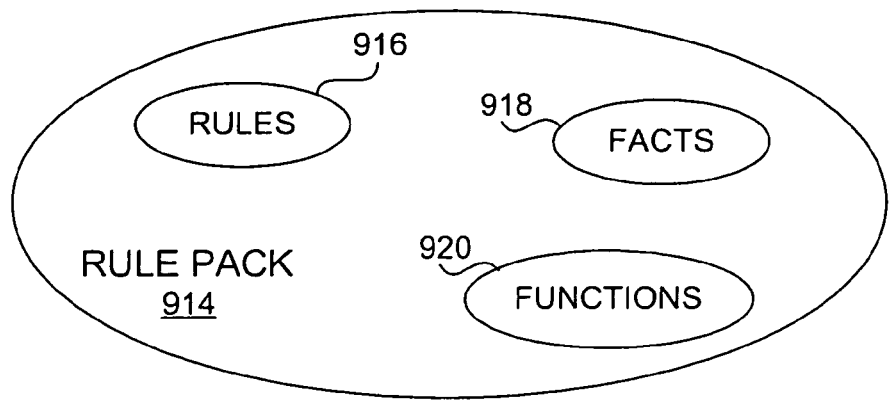
FIG. 9B is an architecture diagram for a rule pack according to one embodiment of the invention.

FIG. 9B is an architecture diagram for a rule pack 914 according to one embodiment of the invention. The rule pack 914 includes rules 916, facts 918 and functions 920. The rule pack 914 depends on the facts 918 for its reasoning, a set of facts that it generates, a set of functions 920 that it calls upon, and a set of rules 916 that act to read and write facts and perform the functions.

When a rule pack is installed, the system must keep track of its rules, functions, inputs and outputs so that a large installed base of rule packs can be managed. Hence, an individual rule pack can be added to or removed from the knowledge base without adversely affecting the entire system.

Further, two rule packs may operate on the same set of shared facts. The two knowledge rule packs may also generate a set of shared facts. These rule packs can facilitate the tracking of how a fact travels through various rule packs, and how a fact may be generated by multiple mule packs. The functions and rules of rule packs can also be more precisely monitored by using the smaller sized rule packs. It is also possible for one rule to exist in two or more rule packs. Hence, when such two or more rule packs that share a rule are merged into a knowledge base, only one copy of the rule need exist within the knowledge base.

An expert system object manages the knowledge base. For example, the expert system object can reset an inference engine, load and unload rule packs or domains, insert or retract runtime facts, etc.

The knowledge representation utilized by the present invention makes use of three major components: facts, rules and actions. Collectively, these components are utilized to perform the tasks of monitoring and managing a computer resource, such as a JVM, an operating system, a network, database or applications.

Figure 10:
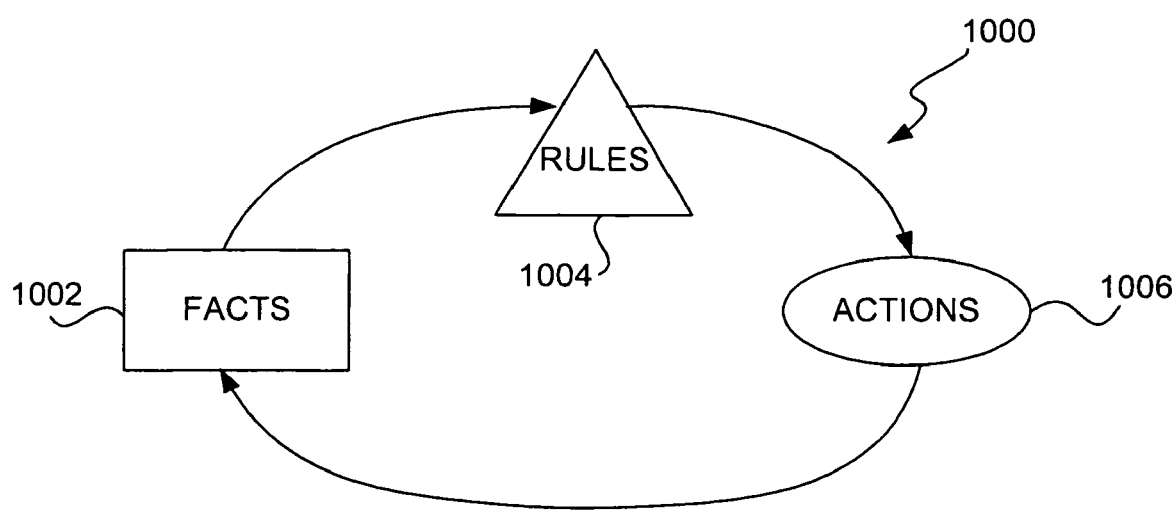
FIG. 10 illustrates a relationship between facts, rules and actions.

FIG. 10 illustrates a relationship 1000 between facts 1002, rules 1004 and actions 1006. According to the relationship 1000, facts 1002 trigger rules 1004. The rules 1004 that are triggered, cause the actions 1006. The actions 1006 then may cause additional facts to be added to the repository of the facts 1002. A fact can be considered a record of information. One example of a fact is the number of threads running in a JVM. Another example of a fact is an average load on a CPU. Rules are presented as "if—then" statements. In one embodiment, the left-hand side of the "if—then" statement can have one or more patterns, and the right-hand side of the "if—then" rule can contain a procedural list of one or more actions. The patterns are used as conditions to search for a fact in the repository of the facts 1002, and thus locate a rule that can be used to infer something. The actions are functions that perform a task. As an example, the actions can be considered to be statements that would otherwise be used in the body of a programming language (e.g., JAVA or C programs). As another example, the actions can be used to obtain debug information using a resource.

The rules 1004 can be represented in JAVA Expert Systems Shell (JESS) and as a rule engine that drives these rules. JESS offers a CLIPS-like language for specifying inference rules, facts and functions. The relationship 1000 thus facilitates the creation of a data-driven knowledge base that is well-suited for monitoring and managing computer resources.

Figure 11:
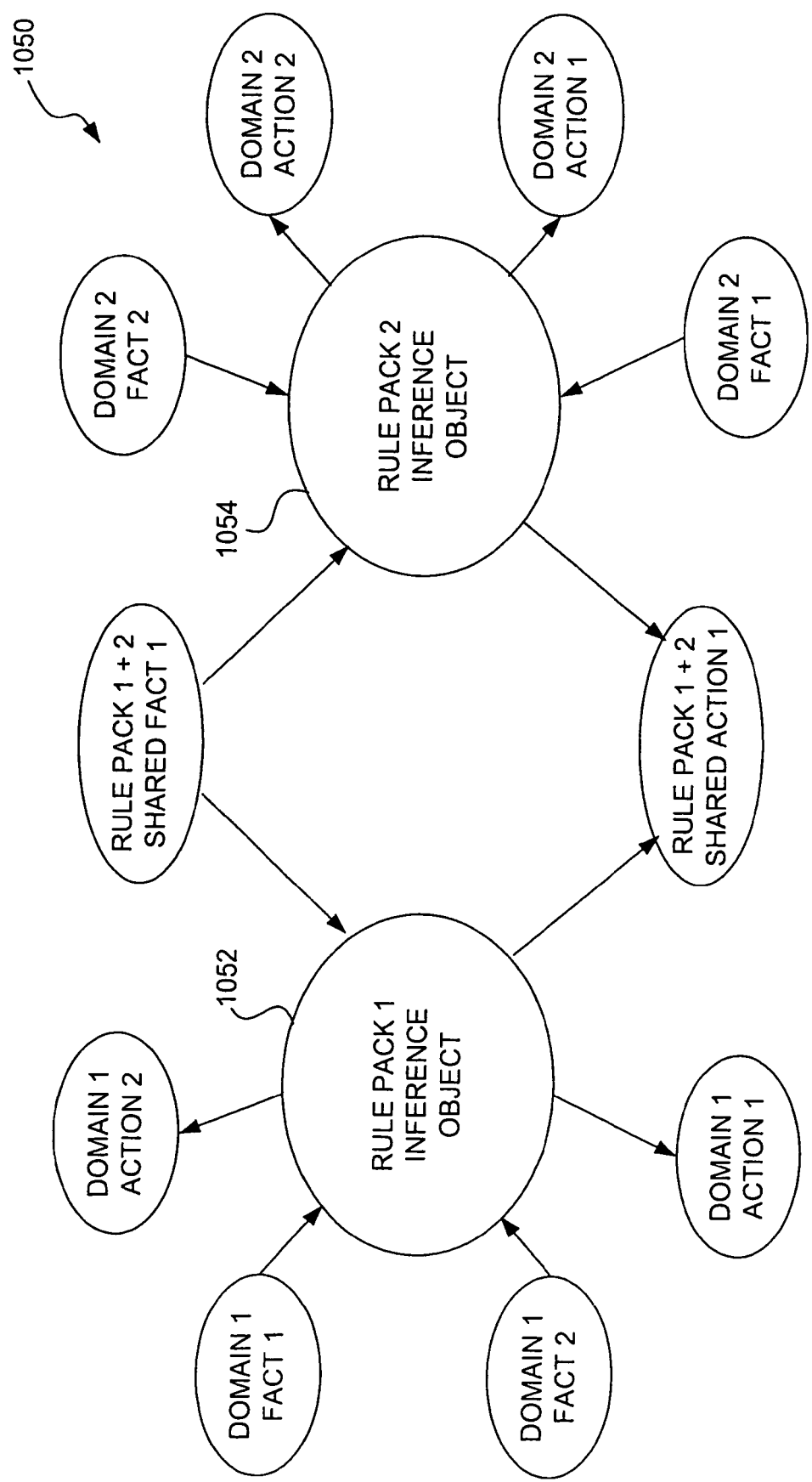
FIG. 11 illustrates an object diagram for a representative knowledge representation.

FIG. 11 illustrates an object diagram 1050 for a representative knowledge representation. The object diagram 1050 includes a rule pack 1 inference object 1052 and a rule pack 2 inference object 1054. An inference object for a rule pack encompasses the rules written for that knowledge domain(s) and a rules engine can then read and execute these rules. A JESUS package can be utilized to provide this functionality. Surrounding each of the inference objects 1052 and 1054 are domain facts and domain actions. Although the arrangement of the rule packs shown in FIG. 11 is such that the rule packs pertain to a particular domain, rule packs can also be arranged to pertain to multiple domains.

The relationship between a domain fact and an inference object is always an arrow pointing from the fact to the inference object, thereby denoting that facts are "driving" the rules inside the inference engine. The relationship between the inference object and the actions are that of an arrow pointing from the inference object toward the action—meaning the inference rules "drive" the actions. Between the two inference objects 1052 and 1054 are facts and actions that both inference objects 1052 and 1054 utilize. In effect, these inference objects 1052 and 1054 are cooperative expert systems, namely, expert systems that cooperate in a group by sharing some of their knowledge with one another.

Facts can be used to represent the "state" of an expert system in small chunks. For example, a fact may appear as "MAIN::jvm-jvm_heapused (v "3166032") (uid "372244480") (instance "13219") (host unknown)" The content of the fact indicates that in the current Java Virtual Machine (JVM) on system "unknown" with instance or process id 13219, the size of heap used is 3166032 bytes. In this example, uid, instance and host are some of the attributes of the resource jvm_heapused belonging to the domain jvm. The attributes of a resource that are not used for comparison with other resources, need not be included in the facts for the resource. Facts, as implemented by JESS, exist inside the rules engine. To add an additional fact into the rules engine, the new fact is injected into the inference engine object. The repository of facts can be represented hierarchically. The knowledge base can, for example, be sorted and transmitted as needed as a set of XML documents or provided as shared distributed databases using LDAP or as JAVA Properties files.

In the case of a cooperative expert system, access to a shared set of facts is needed. The facts can be logically organized into separate domains. In one implementation, a user may choose to organize shared knowledge into separate knowledge rule packs, or alternatively, allow the same fact definition to exist within multiple rule packs. In the later approach, the system can manage the consistency of the facts using a verification process at the managed resource node (in the form of capability requests) and at the knowledge control module (in the form of definition verification).

The rules are used to map facts into actions. Rules are preferably domain-specific such that separate domains of knowledge are thus provided as modular and independent rule sets. Hence, the modification of one domain of rules and its internal facts would not affect other domains. These different rule packs of rules interact with each other only through shared facts.

An example of a rule implemented using JESS is as follows:

```
(Defrule default-jvm-memory-leak-detect
  (jvm-jvm_heapused (v ?r1) (uid ?uid) (instance ?instance)
  (host ?host)) (test ( > ?r1 1000000)
  =>
  (...some actions...)
)
```

The "default—" prefix denotes the rule pack the rule belongs to. Since it is possible that memory leak can exist for application or application server, utilizing separate name spaces for each rule pack of rules allows separation of these rules into different rule packs. Another advantage of using separate name space for different rule packs is that JESS rules are serializable, meaning that text rules can be encoded into binary form. The ability to store rules in binary form serves to protect the intellectual property encoded within the rules.

Actions are procedural statements to be executed. The actions may reside on the right-hand side of rules in the form of scripts or can be embedded as methods inside programming objects (e.g., JAVA objects). In the case of scripts, the scripts are inference engine-dependent such that different inference engines would utilize different scripts because of the different languages utilized by the inference engines. In the case of programming objects, the actions are functions. For example, actions in JAVA can be implemented by registering them as new JESS functions. Alternatively, the functions could be packaged inside fact objects for which such rules are relevant. The functions could in turn request relevant resource values from the managed nodes and assert the values obtained as facts into the inference engine. The fact objects (e.g., get values) represent values obtained from agents (e.g., using a scheduler of an agent).

Given that actions can be complicated and not tied to any particular facts, it is often more efficient to create a global object for a domain and include the methods or functions for actions therein such that every rule within a rule pack has access to the actions.

Through the use of a modular design, the system becomes easier to manage even when thousands of rules and facts exist. By separating rules into rule packs and facts into domains, and making it difficult for domains to interfere with one another, the expert system is effectively divided into smaller modular pieces. Additionally, through use of JESS's built-in watch facility, the system can track those rules that have fired and the order in which they have fired. This watch facility thus provides a limited tool for debugging a knowledge system. Groups of rules can be isolated for inspection by turning off other rules. Rules can be turned off by deactivating those inference objects from firing which are not desired. If one were to desire to debug a set of rules related to one domain, such a set of rules could be manually grouped into a logical group (e.g., rule pack) and user of the management system can use GUI 202 to control the activation of each group. Using GUI 202, user can additionally control activation of a single or a selected set of rules within a rule pack.

Initialization scripts can be used to set up all the components needed for a rule pack. The setup can operate to create the inference object, load the rules, create initial facts, create action objects, and link all the objects together so that they can inter-operate.

In the JESS/JAVA implementation, one inference object may contain rules from one or more rule packs. Outside the inference object are objects that represent facts and objects that encapsulate actions. Each inference object is attached to a set of facts and actions. The rules engine searches the facts for matches that can trigger a rule to fire. Once a rule is fired, one or more action objects being linked thereto are invoked. Actions can also be explicitly linked by using an initialization that involves JAVA object creation and passing handles to these objects to appropriate JESS inference objects.

One useful aspect of the rule engine design is the ability of the system to manage different combinations of multiple products on multiple nodes using one set of rule packs and one manager. This simplifies the distribution, configuration and manageability of rule packs on per-user basis. For example, the rules engine can have rule packs for managed products JVM and Oracle loaded, but one managed node may not have Oracle as the managed product. In this case, naturally there will be no facts corresponding to Oracle resources for the managed node asserted into the inference engine and hence the rules using those Oracle resources will not be active for the managed node without Oracle as a managed product. Note that the information about the managed node is part of the fact representing any Oracle resource.

Another useful aspect of the rules engine design is the implicit chaining of rules by the inference engine. A user of the system defines individual rules representing a problem or diagnostic "cases". The system combines these individual rules based on the use of common facts representing resources. For example, one rule can be, represented in a meta-language, "IF (jvm—uncaught_exception AND filter—exception_is_Oracle_connections_exhausted) THEN (get Oracle—max_connections_configured)". A second rule can be, represented in a meta-language, "IF (Oracle—max_connections_configured<50) THEN (email dba)". When the inference engine is running, if the jvm_uncaught exception gets asserted into the inference engine and if the asserted fact contains the Oracle_connections_exhausted status, then the management system will obtain the Oracle—max_connections_configured resource from the same managed node as described by the host attribute of the exception resource. On request from the interface engine, the corresponding fact will be asserted into the inference engine. The inference engine will now automatically detect the second rule definition using the Oracle—max_connections_configured resource and the second rule will automatically get into action. It will check if the fact value representing the Oracle—max_connection_configured resource is greater than 50 and, if so, it will automatically send electronic mail to the dba.

Figure 12:
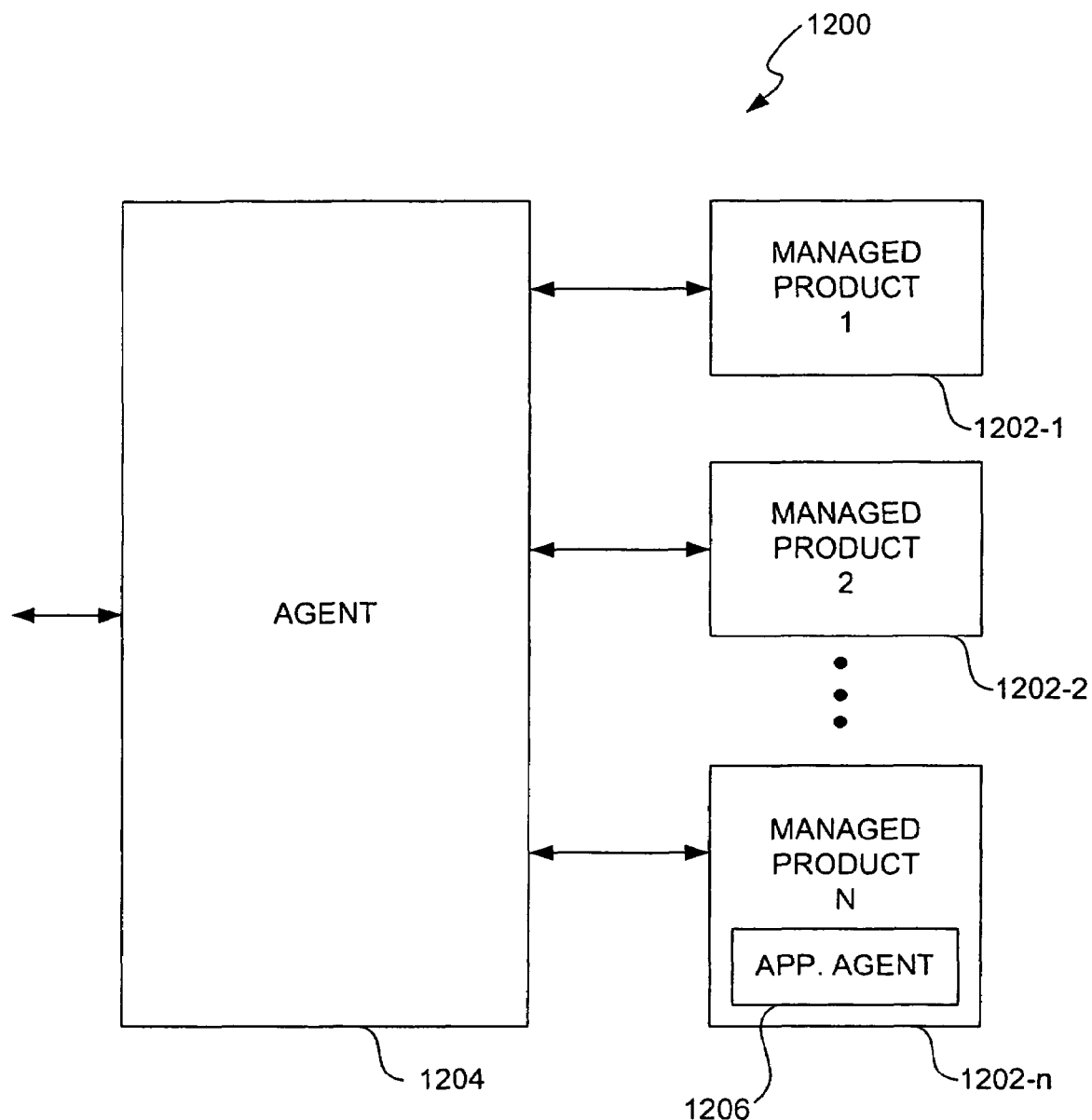
FIG. 12 is a block diagram of the managed node according to one embodiment of the invention.

FIG. 12 is a block diagram of the managed node 1200 according to one embodiment of the invention. The managed node 1200 is, for example, suitable for use as one or more of the managed nodes 102 illustrated in FIG. 1.

The managed node includes a plurality of different managed products 1202. In particular, the managed node 1200 includes managed products 1202-1, 1202-2, . . . , 1202-n. These managed products 1202 are software products that form part of the system being managed by a management system. The managed products can vary widely depending upon implementation. As examples, the managed products can pertain to a Solaris operating system, an Oracle database, or a JAVA application.

The managed node 1200 also includes an agent 1204. The agent 1204 couples to each of the managed products 1202. The agent 1204 also couples to a manager (e.g., the manager 108 illustrated in FIG. 1) via the management framework 106. In general, the agent 1204 can interact with the managed products 1202 such that the managed products 1202 can be monitored and possibly controlled by the management system via the agent 1204.

Additionally, in one embodiment, one or more of the managed products 1202 can include an application agent 1206. For example, as shown in FIG. 12, the managed product N 1202-n includes the application agent 1206. Here, the application agent 1206 resides within the process space of the managed product N 1202-n (and thus out of the process space of the agent 1204). The application agent 1206 can render the managed product N 1202-n more manageable by the agent 1204. For example, the application agent 1206 can enable any JAVA application to be managed. The capabilities of the application agent 1206 can be further enhanced by the user adding application code to the application agent conforming to the Application Programming Interfaces (API) provided by the application agent 1206. This methodology provides a convenient means for the user to add his/her application specific information such that it becomes available as resources to the rest of the management system.

Figure 13:
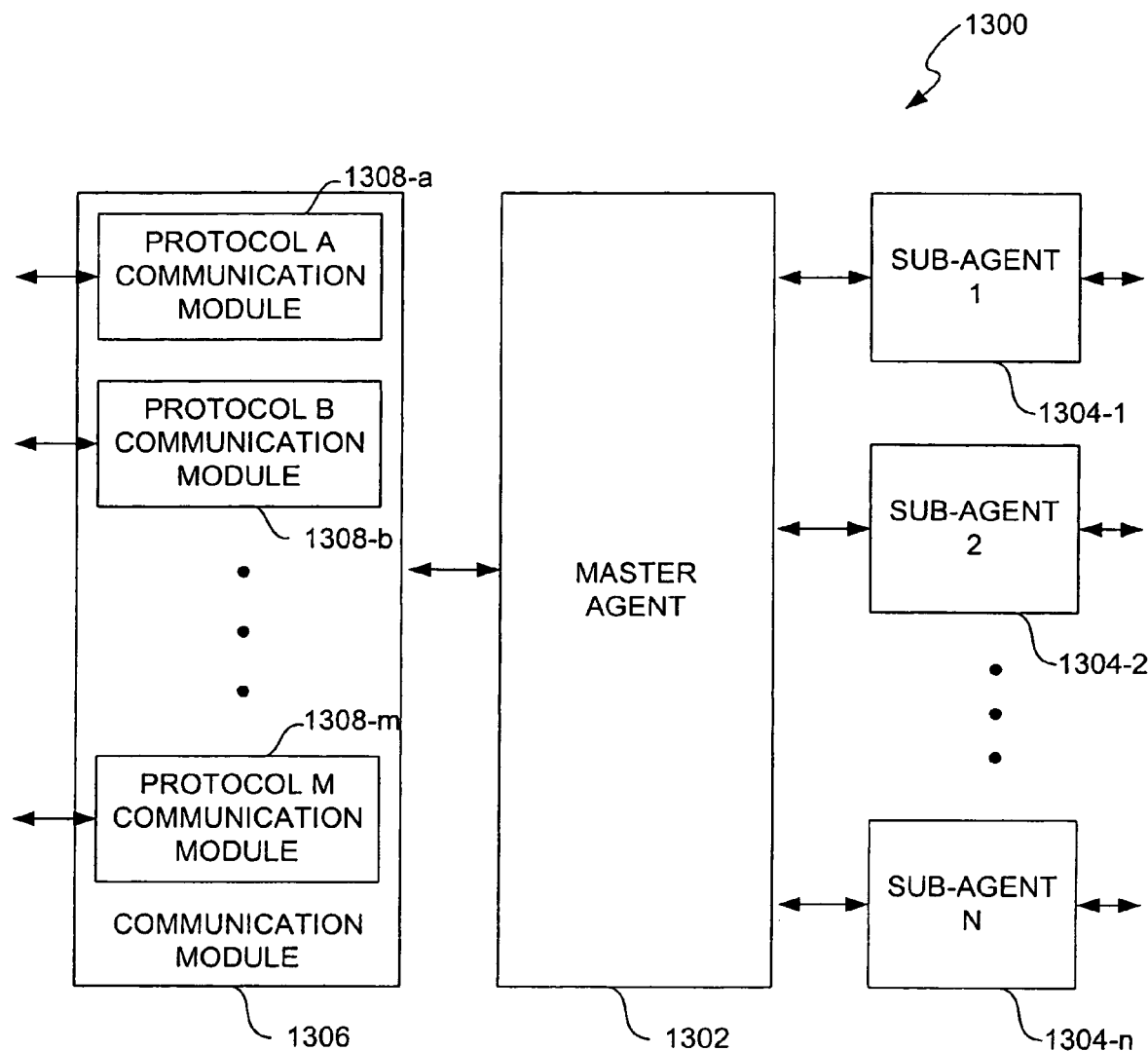
FIG. 13 is a block diagram of an agent according to one embodiment of the invention.

FIG. 13 is a block diagram of an agent 1300 according to one embodiment of the invention. The agent 1300 is, for example, suitable for use as the agent 1204 illustrated in FIG. 12.

The agent 1300 includes a master agent 1302 that couples to a plurality of sub-agents 1304. In particular, the agent 1300 utilizes N sub-agents 1304-1, 1304-2, ..., 1304-n. Each of the sub-agents 1304-1, 1304-2, ..., 1304-n respectively communicates with the managed products 1202-1, 1202-2, ..., 1202-n shown in FIG. 12. The master agent 1302 thus interacts with the various managed products 1202 through the appropriate one of the sub-agents 1304. The master agent 1302 includes the resources that are shared by the sub-agents 1304. These shared resources are discussed in additional detail below with respect to FIG. 14. The master agent 1302 also provides an Application Programming Interfaces (API) that can be used by the user to write a sub-agent that can interact with a managed product for which a sub-agent is not provided by the management product. Using this API, the user-written sub-agent can make available the managed product specific information as resources to the rest of the management product including the master agent 1302 and the manager 108.

The agent 1300 also includes a communication module 1306. The communication module 1306 allows the agent 1300 to communicate with a management framework (and thus a manager) through a variety of different protocols. In other words, the communication module 1306 allows the agent 1300 to interface with other portions of a management system over different protocol layers. These communication protocols can be standardized, general purpose protocols (such as SNMP), or product-specific protocols (such as HPOV-SPI from Hewlett-Packard Company) or various other proprietary protocols. Hence, the communication module 1306 includes one or more protocol communication modules 1308. In particular, as illustrated in FIG. 13, the communication module 1306 can include protocol communication modules 1308-a, 1308-b, ..., 1308-m. The protocol A communication module 1308-a interfaces to a communication network that utilizes protocol A. The protocol B communication module 1308-b interfaces with a communication network that utilizes protocol B. The protocol M communication module 1308-m interfaces with a communication network that utilizes protocol M.

Figure 14:
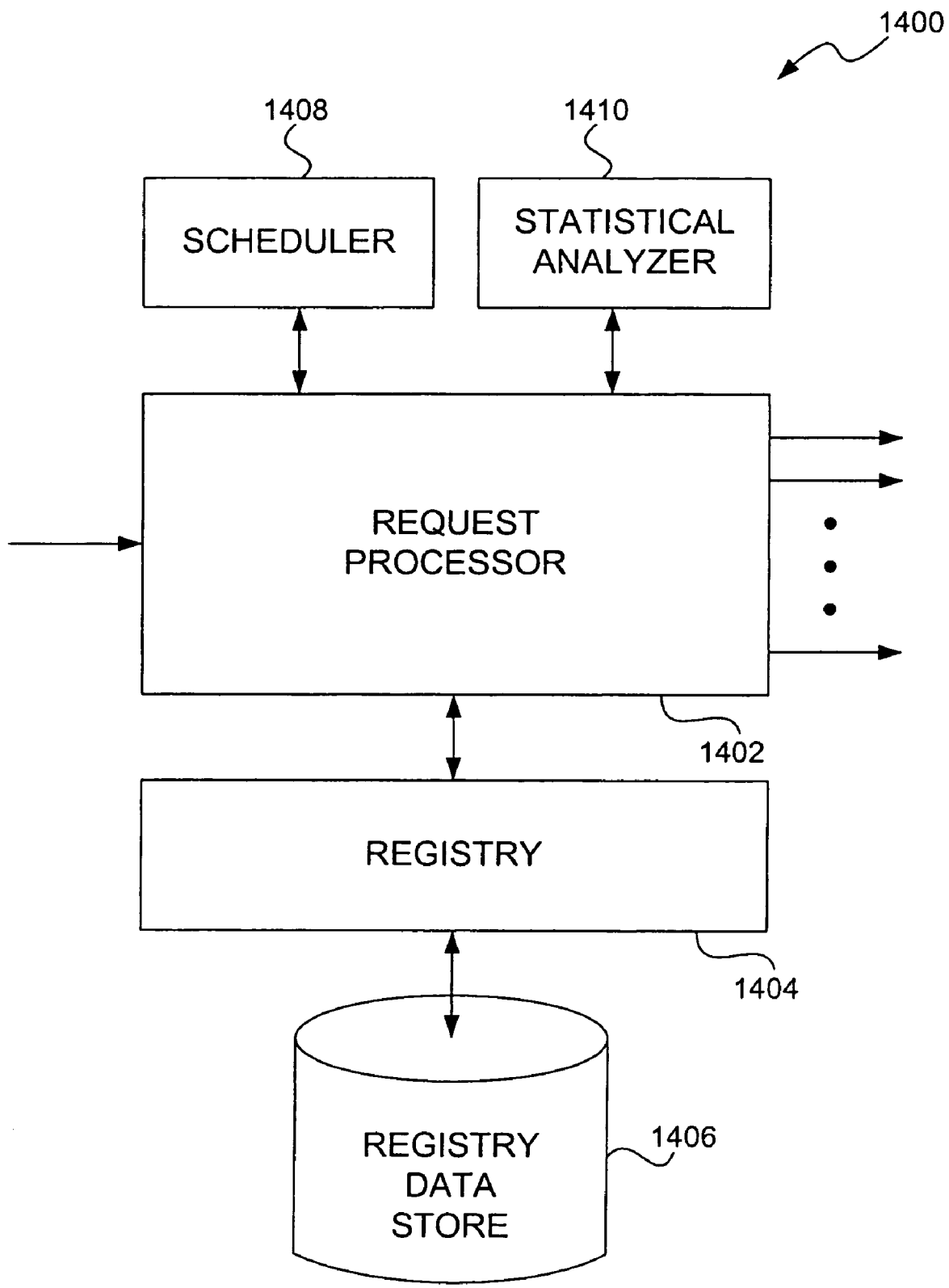
FIG. 14 is a block diagram of a master agent according to one embodiment of the invention.

FIG. 14 is a block diagram of a master agent 1400 according to one embodiment of the invention. The master agent 1400 is, for example, suitable for use as the master agent 1302 illustrated in FIG. 13.

The master agent 1400 includes a request processor 1402 that receives a request from the communication module 1306. The request is destined for one of the managed products 1202. Hence, the request processor 1402 operates to route an incoming request to the appropriate one of the sub-agents 1304 associated with the appropriate managed product 1202. Besides routing a request to the appropriate sub-agent 1304, the request processor 1402 can also perform additional operations, such as routing return responses from the sub-agents 1304 to the communication module 1306 (namely, the particular protocol communication module 1308 that is appropriate for use in returning the response to the balance of the management system, i.e., the manager).

The master agent 1400 typically includes a registry 1404 that stores registry data in a registry data store 1406. The registry 1404 manages lists which track the sub-agents 1304 that are available for use in processing requests for notification to the sub-agents 1304 or the protocol communication modules 1308. These lists that are maintained by the registry 1404 are stored as registry data in the registry data store 1406. Hence, the registry 1404 is the hub of the master agent 1400 for all traffic and interactions for other system components carried out at the agent 1300. The functionality provided by the registry 1404 includes (1) a mechanism for sub-agent registration, initialization, and dynamic configuration; (2) a communication framework for the sub-agent's interaction with the manager node through different communication modules present at the agent; (3) a notification mechanism for asynchronous notification delivery from the monitored systems and applications to the communication modules and the manager node; and (4) a sub-agent naming service so that sub-agents can be addressed by using simple, human-readable identifiers. The registry 1404 also acts as an interface between the communication modules 1308 so that the communication modules 1308 are able to configure registered sub-agents and receive asynchronous notifications from the registered sub-agents.

The master agent 1400 also includes a scheduler 1408 and statistical analyzer 1410. The scheduler 1408 can be utilized to schedule requests in the future to be processed by the request processor 1402. The statistical analyzer 1410 can be utilized to process (or at least pre-process) the response data being returned from the managed product 1202 before some or all data is returned to the manager. Hence, by having the master agent 1400 perform certain statistical analysis at the statistical analyzer 1410, the processing load on the manager can be distributed to the master agents.

Each of the sub-agents 1304 can be a pluggable component enclosing monitoring and control functionality pertinent to a single system or application. The sub-agents 1304 are known to the managed products through the registry 1404. In other words, each of the sub-agents 1304 is registered and initialized by the registry 1404 before it can receive requests and send out information about the managed product it monitors. The principal task of the sub-agent 1304 is to interact with the managed product (e.g., system/application) it controls or monitors. The sub-agent 1304 serves to hide much interaction detail from the rest of the agent 1300 and provides only a few entry points for request into the information.

The different protocols supported by the communication module 1306 allow the communication module 1306 to be dynamically extended to support additional protocols. As a particular protocol communication module 1308 is initialized, the registry 1404 within the master agent 1400 is informed of the particular protocol communication module 1308 so that asynchronous notifications from the managed objects can be received and passed to the manager via the particular protocol communication module 1308.

The communication module 1306 receives requests from a manager through the protocol supported by the particular protocol communication module 1308 that implements and forwards such requests to the appropriate sub-agent 1304 corresponding to the appropriate managed node. The registry 1404 within the master agent 1400 is utilized to forward the request from the protocol communication module 1308 and the sub-agents 1304.

In addition, the protocol communication module 1308 also provides a callback for the sub-agents 1304 such that notifications are able to be received from the managed product and sent back to the manager. If such callbacks are not provided, the notifications will be ignored by the sub-agents 1304 and, thus, no error will be reported to the manager. Hence, each of the protocol communication modules 1308 can be configured to handle or not handle notifications as desired by any particular implementation.

Figure 15:
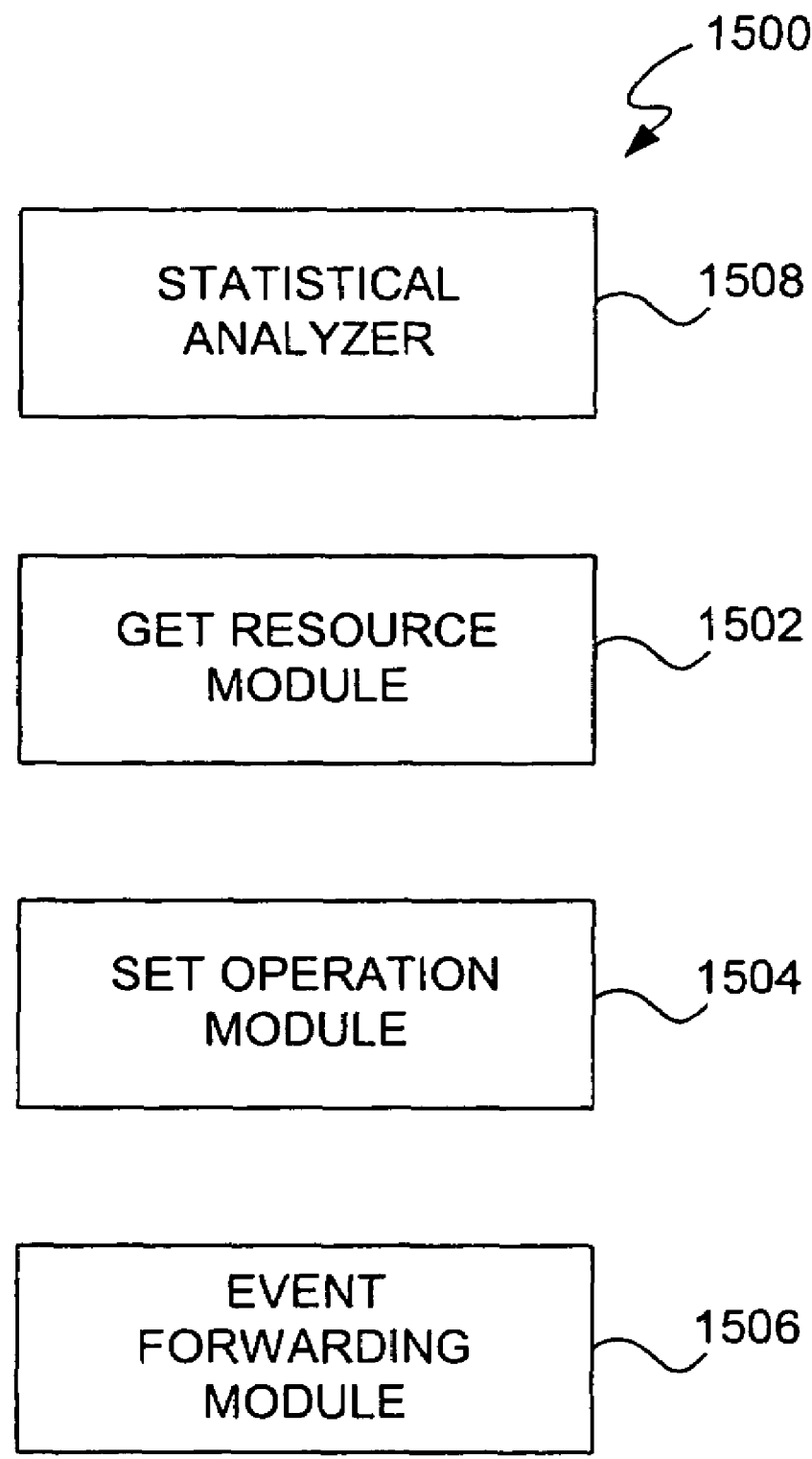
FIG. 15 is a block diagram of a sub-agent according to one embodiment of the invention.

FIG. 15 is a block diagram of a sub-agent 1500 according to one embodiment of the invention. The sub-agent 1500 is, for example, suitable for use as any of the sub-agents 1304 illustrated in FIG. 13.

The sub-agent 1500 includes a get resource module 1502, a set operation module 1504, and an event forwarding module 1506. The get resource module 1502 interacts with a managed product to obtain resources being monitored by the managed product. The set operation module 1504 interacts with the managed product to set or control its operation. The event forwarding module 1506 operates to forward events that have occurred on the managed product to the manager. In addition, the sub-agent 1500 can further include a statistical analyzer 1508. The statistical analyzer 1508 can operate to perform statistical processing on raw data provided by a managed product at the sub-agent level. Hence, although the master agent 1400 may include the statistical analyzer 1410, the presence of statistical analyzer 1508 in each of the sub-agents 1500 allows further distribution of the processing load for statistical analysis of raw data.

Figure 16A:
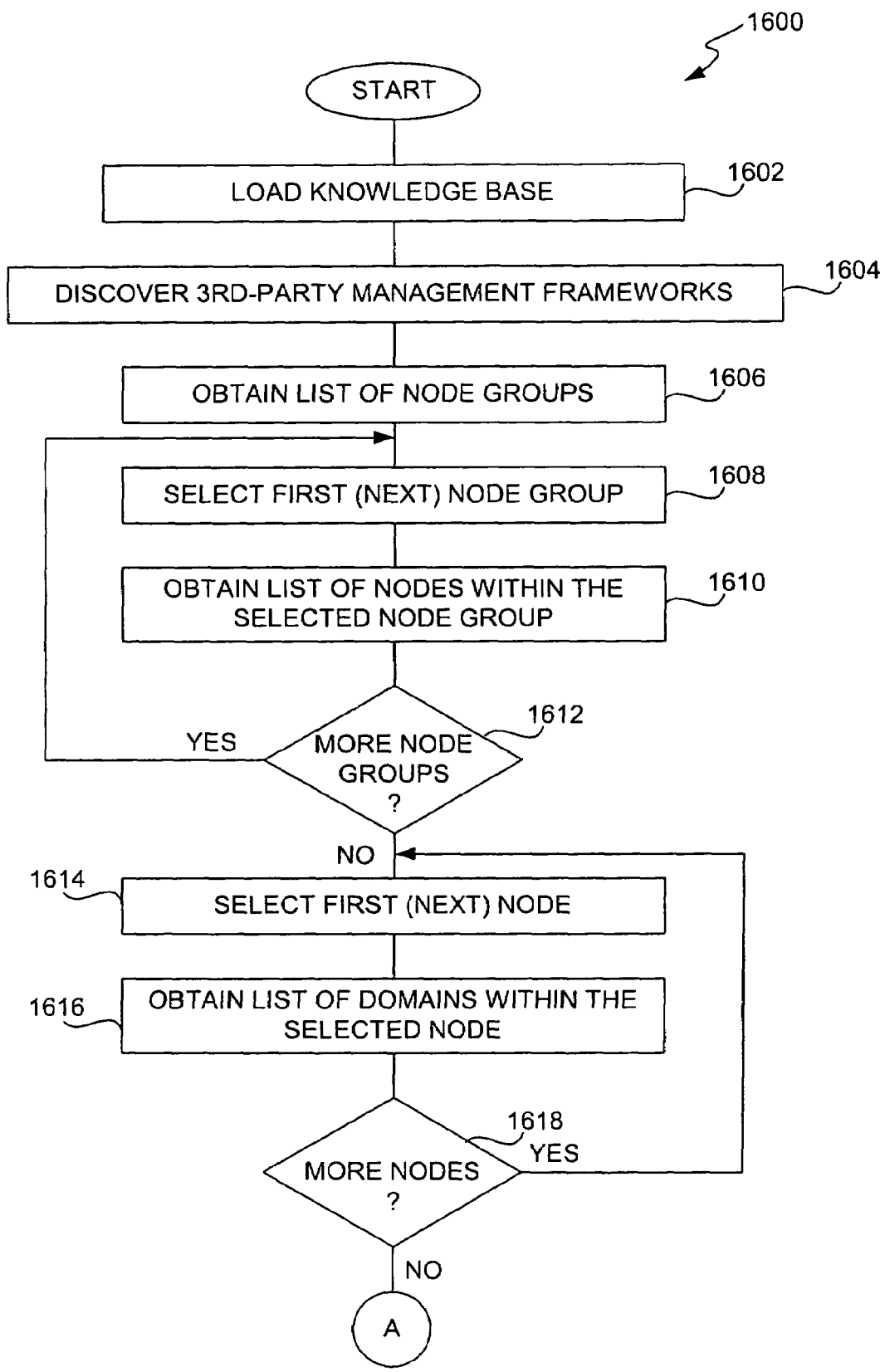
FIGS. 16A and 16B are flow diagrams of manager startup processing according to one embodiment of the invention.
Figure 16B:
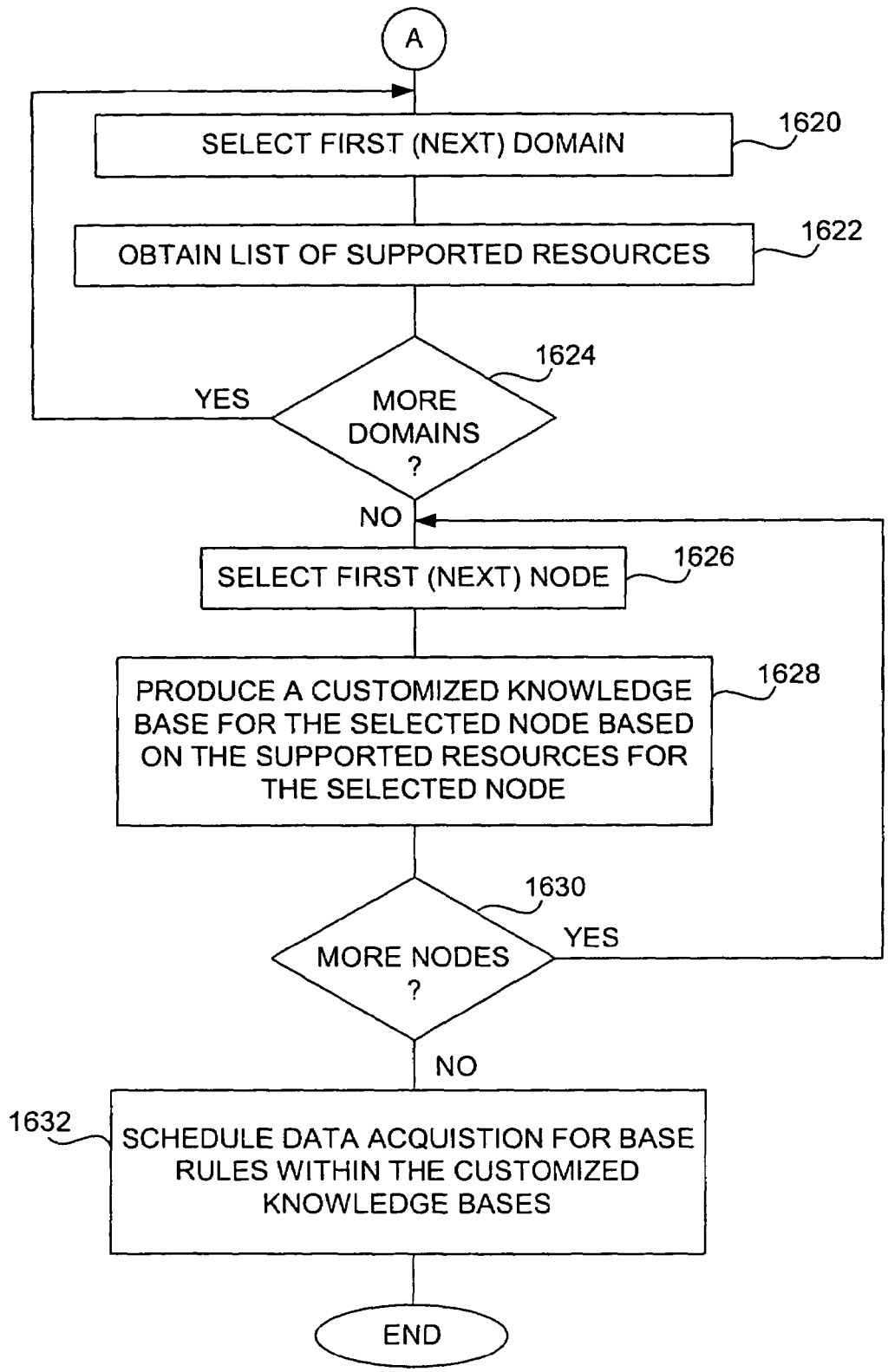

FIGS. 16A and 16B are flow diagrams of manager startup processing 1600 according to one embodiment of the invention. The manager startup processing 1600 initially loads 1602 a knowledge base. The manager is, for example, the manager 200 illustrated in FIG. 2 and includes a knowledge base, such as the knowledge base 206 illustrated in FIG. 2. Once the knowledge base is loaded 1602, third-party management frameworks are discovered 1604. In one implementation, a management framework interface, such as the management framework interface 212 illustrated in FIG. 2, is utilized to identify and establish an interface to all available third-party management frameworks. Next, a list of node groups is obtained 1606. In one implementation, the list of node groups is retrieved by the management framework interface.

Next, a first node group is selected 1608 from the list of node groups. For the selected node group, a list of nodes within the selected node group is obtained 1610. A decision 1612 then determines whether there are more node groups to be processed. When the decision 1612 determines that there are more node groups to be processed, then the manager startup processing 1600 returns to repeat the operations 1608 and 1610 for a next node group. When the decision 1612 determines that there are no more node groups to be processed, all the nodes within each of the node groups have thus been obtained.

At this point, processing is performed on each of the nodes. A first node from the various nodes that have been obtained is selected 1614. Then, a list of domains within the selected node is obtained 1616. A decision 1618 then determines whether there are more nodes to be processed. When the decision 1618 determines that there are more nodes to be processed, then the manager startup processing 1600 returns to repeat the operations 1614 and 1616 for a next node.

On the other hand, when the decision 1618 determines that there are no more nodes to be processed, then processing can be performed for each of the domains. At this point, the manager startup processing 1600 performs processing on each of the domains that have been obtained. In this regard, a first domain is selected 1620. Then, a list of supported resources is obtained 1622 for the selected domain. A decision 1624 then determines whether all of the domains that have been identified have been processed. When the decision 1624 determines that there are additional domains to be processed, the manager startup processing 1600 returns to repeat the operations 1620 and 1622 for a next domain such that each domain can be similarly processed.

Next, processing is performed with respect to each of the nodes. At this point, a first node is selected 1626. Then, a customized knowledge base is produced 1628 for the selected node based on the supported resources for the selected node. In other words, the generalized knowledge base that is loaded 1602 is customized at operation 1628 such that a customized knowledge base is provided for each node that is active or present within the system being managed. A decision 1630 then determines whether there are more nodes to be processed. When the decision 1630 determines that there are more nodes to be processed, then the manager startup processing 1600 returns to repeat the operations 1626 and 1628 for a next node. Alternatively, when the decision 1630 determines that there are no more nodes to be processed, then data acquisition for those base rules within the customized knowledge bases can be scheduled 1632. Once the data acquisition has been scheduled 1632, the manager startup processing 1600 is complete and ends.

Figure 16C:
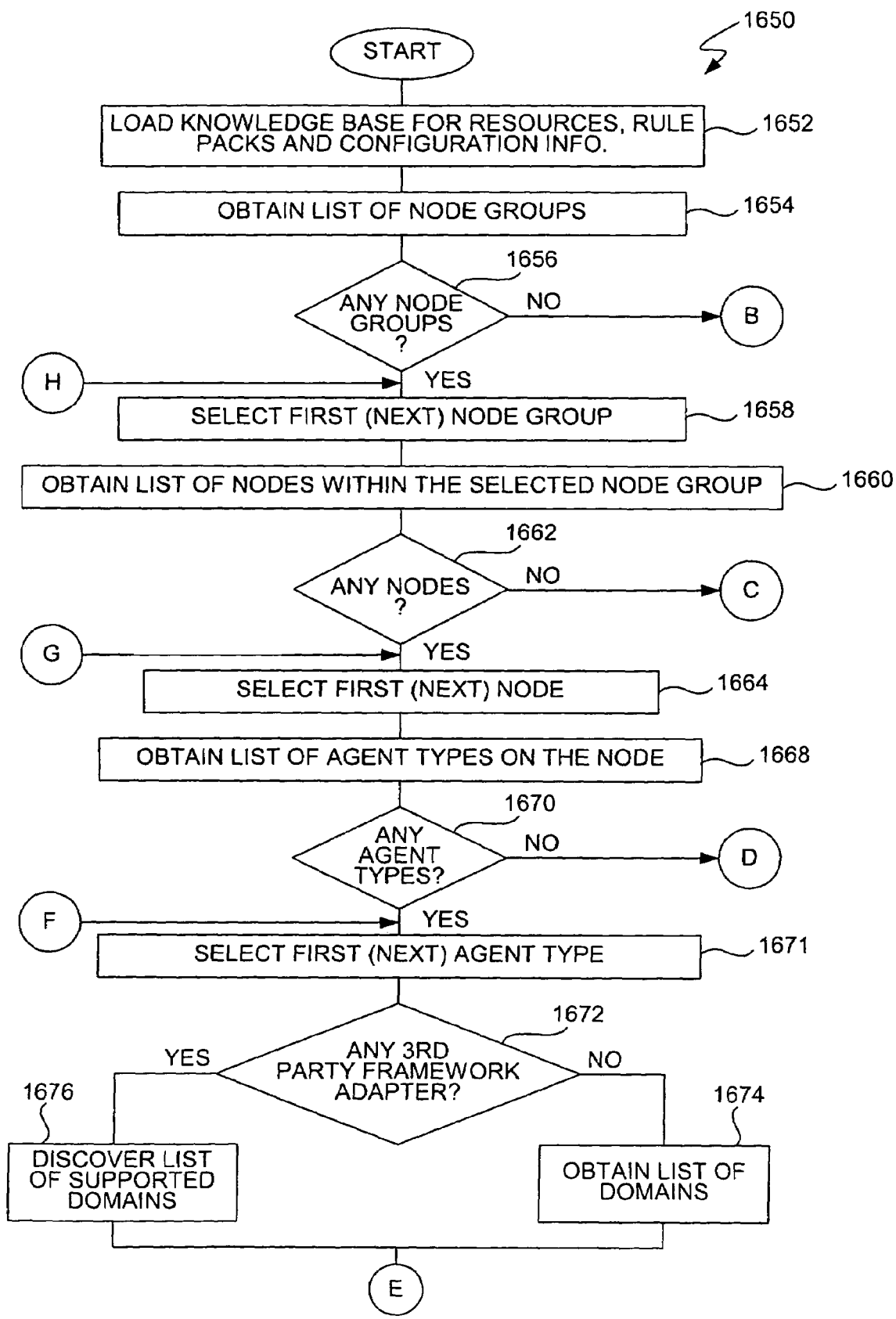
FIGS. 16C-16E are flow diagrams of manager startup processing according to another embodiment of the invention.
Figure 16D:
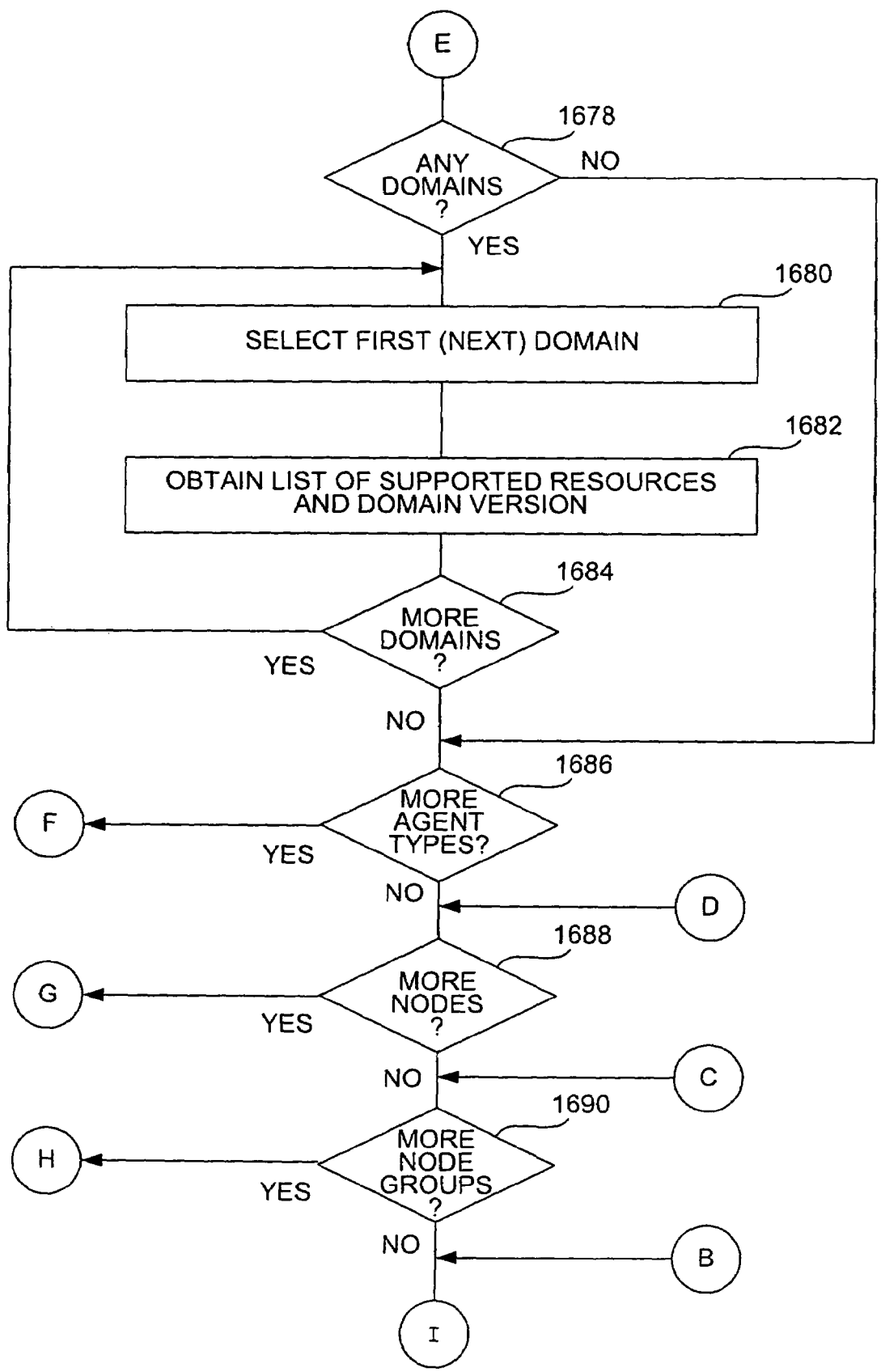
Figure 16E:
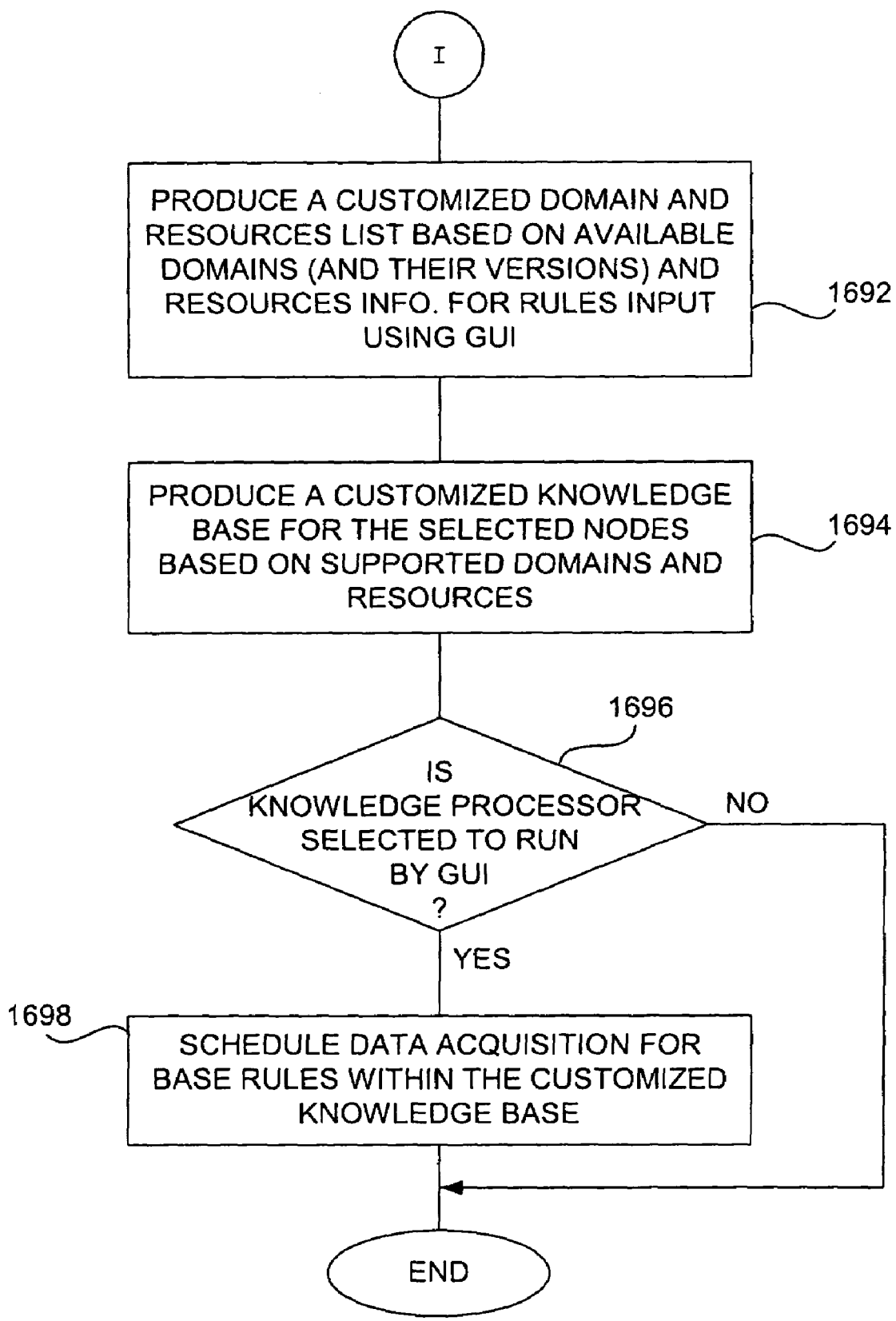

FIGS. 16C-16E are flow diagrams of manager startup processing 1650 according to another embodiment of the invention. The manager startup processing 1650 initially loads 1652 a knowledge base with resources, rule packs and configuration information. The manager is, for example, the manager 200 illustrated in FIG. 2 and includes a knowledge base, such as the knowledge base 206 illustrated in FIG. 2. Once the knowledge base is loaded 1652, a list of node groups is obtained 1654.

A decision 1656 then determines whether there are any node groups to be processed. When the decision 1656 determines that there are node groups to be processed, then a first node group is selected 1658. Then, a list of nodes within the selected node group is obtained 1660.

Next, a decision 1662 determines whether there are any nodes in the selected node group that are to be processed. When the decision 1662 determines that there are nodes within the selected node group to be processed, then a first node is selected 1664. Then, for the selected node, a list of agent types on the selected node is obtained 1668.

A decision 1670 then determines whether there are any agent types to be processed. When the decision 1670 determines that there are agent types to be processed, a first agent type is selected 1671. Then, for the selected agent type, a decision 1672 determines whether there is any third party framework adapter. When the decision 1672 determines that there is no third party framework adapter, then a list of domains is obtained 1674. On the other hand, when the decision 1672 determines that there is a third party framework adapter, then a list of supported domains is discovered 1676. Here, the resulting list of supported domains includes information about product(s) supported by the third party adapter. The concept of domain in this case is adapter-specific. For example, for SNMP adapter, all resources supported by the SNMP master agent on a managed node can be considered belonging to a domain. Another concept of domain for SNMP adapter can correspond to the resources supported by every SNMP sub-agent on the managed node communicating with the SNMP master agent Following the operations 1674 and 1676, a decision 1678 determines whether there are any domains within the selected agent type. When the decision 1678 determines that there are domains, then a first domain is selected 1680. Then, a list of supported resources and domain version are obtained 1682. Next, a decision 1684 determines whether there are more domains within the selected agent type. When the decision

1684 determines that there are more domains, then the manager startup processing 1650 returns to repeat the operation 1680 and subsequent operations so that a next domain can be similarly processed.

Alternatively, when the decision 1684 determines that there are no more domains within the selected agent type to be processed, as well as directly following the decision 1678 when there are no domains to be processed, a decision 1686 determines whether there are more agent types to be processed. When the decision 1686 determines that there are more agent types to be processed, then the manager startup processing 1650 returns to repeat the operation 1671 and subsequent operations so that a next agent type can be similarly processed.

On the other hand, when the decision 1686 determines that there are no more agent types to be processed, or directly following the decision 1670 when there are no agent types to be processed, a decision 1688 determines whether there are more nodes to be processed. When the decision 1688 determines that there are more nodes to be processed, then the manager startup processing 1650 returns to repeat the operation 1664 and subsequent operations so that a next node can be similarly processed.

Alternatively, when the decision 1688 determines that there are no more nodes to be processed, or directly following the decision 1662 when there are no nodes, a decision 1690 determines whether there are more node groups to be processed. When the decision 1690 determines that there are more node groups to be processed, the manager startup processing 1650 returns to repeat the operation 1658 and subsequent operations so that a next node group can be similarly processed.

On the other hand, when the decision 1690 determines that there are no more node groups to be processed, or directly following the decision 1656 when there are no node groups, a customized domain and resources list is produced 1692 based on available domains (and their versions) and resources information for rules input. Then, a customized knowledge base is produced 1694 for the selected nodes based on supported domains and resources.

A reference resource list can be created using the most-up-to-date version of each domain type. The reference resource list is used in rule definitions. For example, a JVM domain list of resources obtained from one managed node may be larger in number than the list of resources obtained for the JVM domain from a different managed node. This is possible because of enhancement of agent 1204 over time. The reference resource list contains the maximal set of domains and resources from the latest version of all the knowledge domains by name/type. This enables user to define rules for the most complete manageability of the user environment 100 (e.g., using one GUI).

Next, a decision 1696 determines whether a knowledge processor has been selected to run. The decision 1696 enables user to start the management system for development and testing of rules and also, to setup all the managed nodes and select a set rule packs and rules prior to running the knowledge processor. The decision 1696 can be facilitated by a GUI. When the decision 1696 determines that the knowledge processor is to be run, then data acquisition for those base rules within the customized knowledge base can be scheduled 1698. Alternatively, when the decision 1696 determines that the knowledge processor is not selected to run, then the operation 1696 can be bypassed. Following the operation 1696, or its being bypassed, the manager startup processing 1600 is complete and ends.

Figure 17A:
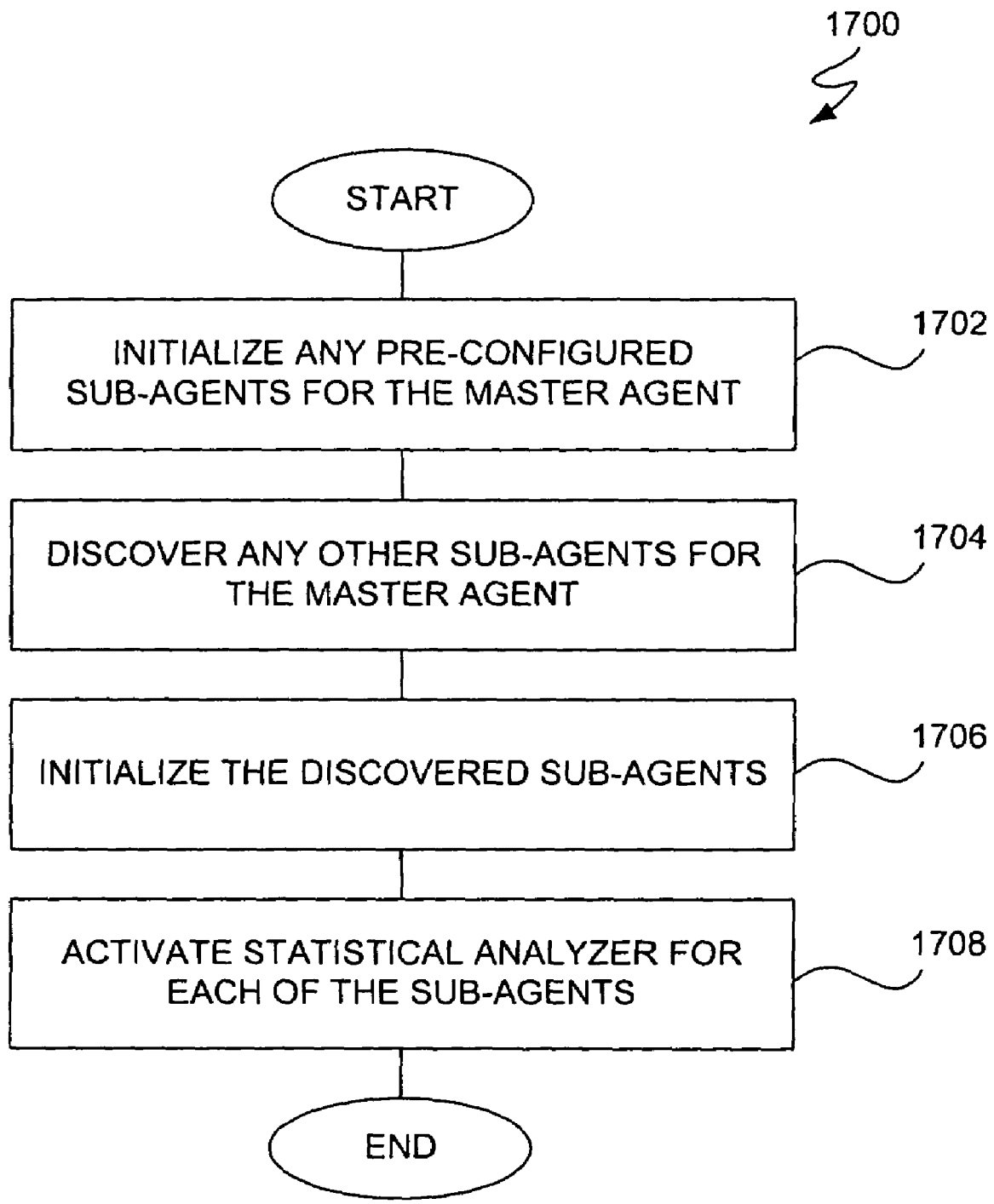
FIG. 17A is flow diagram of master agent startup processing according to one embodiment of the invention.

FIG. 17A is flow diagram of master agent startup processing 1700 according to one embodiment of the invention. A managed node includes an agent to assist the management system in monitoring and managing the managed node. In one embodiment, the agent includes a master agent and a plurality of sub-agents. Hence, the master agent startup processing 1700 pertains to startup processing that is performed by a master agent. The master agent is, for example, the master agent 1302 illustrated in FIG. 13.

The master agent startup processing 1700 initializes 1702 any pre-configured sub-agents for the master agent. Hence, any standard sub-agents for the master agent are initialized 1702. Then, the presence of any other sub-agents for the master agent are discovered 1704. These other sub-agents can be either in-process or out-of-process. An in-process sub-agent would operate in the same process as the master agent. On the other hand, an out-of-process sub-agent would operate in a separate process from that of the master agent. After the any other sub-agents are discovered 1704, the discovered sub-agents are initialized 1706. A statistical analyzer can then be activated 1708 for each of the sub-agents. The statistical analyzers provide the statistics collection for the resources being monitored by the respective sub-agents. Following the operation 1708, the master agent startup processing 1700 is complete and ends.

Figure 17B:
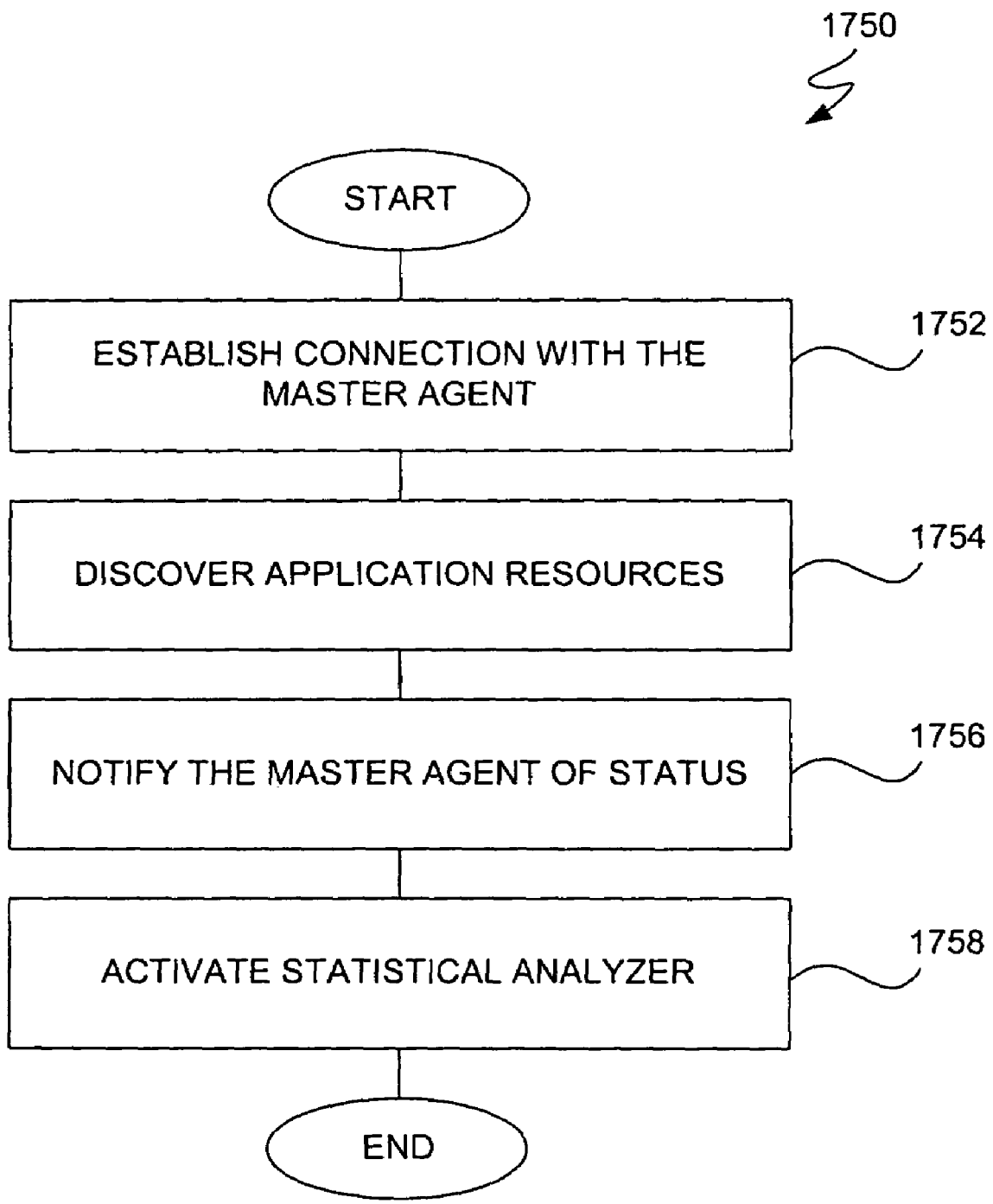
FIG. 17B is a flow diagram of sub-agent startup processing according to one embodiment of the invention.

FIG. 17B is a flow diagram of sub-agent startup processing 1750 according to one embodiment of the invention. The sub-agent startup processing 1750 is performed by a sub-agent. For example, the sub-agent can be one of the sub-agents 1304 illustrated in FIG. 13.

The sub-agent startup processing 1750 initially establishes 1752 a connection with the master agent. The connection is an interface or a communication link between the master agent and the sub-agent. Application resources are then discovered 1754. The application resources are those resources that are available from an application monitored by the sub-agent. The application resources can also include user-defined resources, e.g., using an API. Next, the master agent is notified 1756 of the status of the sub-agent. The status for the sub-agent can include various types of information. For example, the status of the sub-agent might include the resources that are available from the sub-agent, details about the version or operability of the sub-agent, etc. Next, a statistical analyzer can be activated 1758 for the sub-agent. The statistical analyzer allows the sub-agent to perform statistical analysis on resource information available from the sub-agent. Following the operation 1758, the sub-agent startup processing 1750 is complete and ends. It should, however, be recognized that the sub-agent's startup processing 1750 is performed for each of the sub-agents associated with the master agent.

Figure 18A:
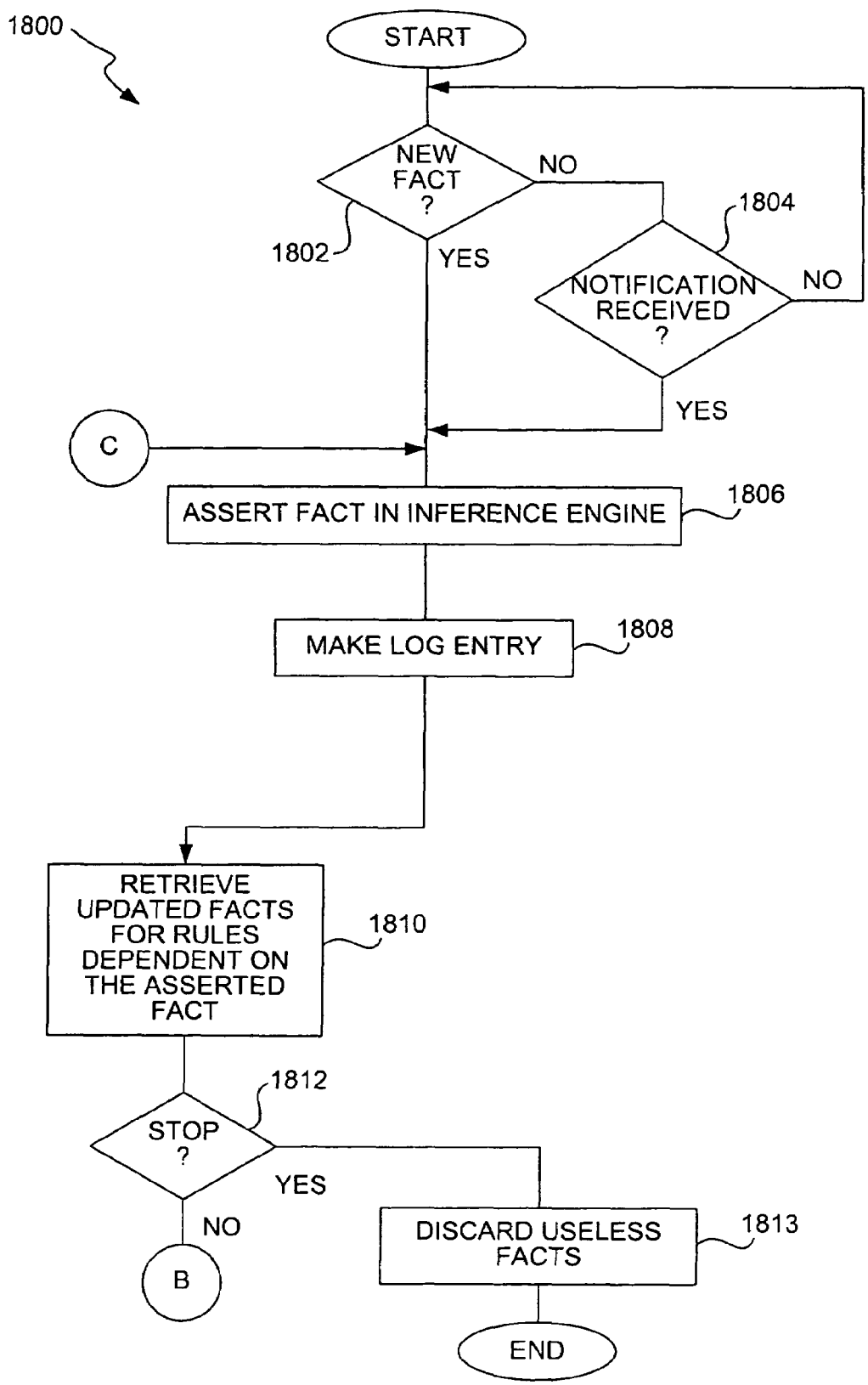
FIGS. 18A and 18B are flow diagrams of trigger/notification processing according to one embodiment of the invention.
Figure 18B:
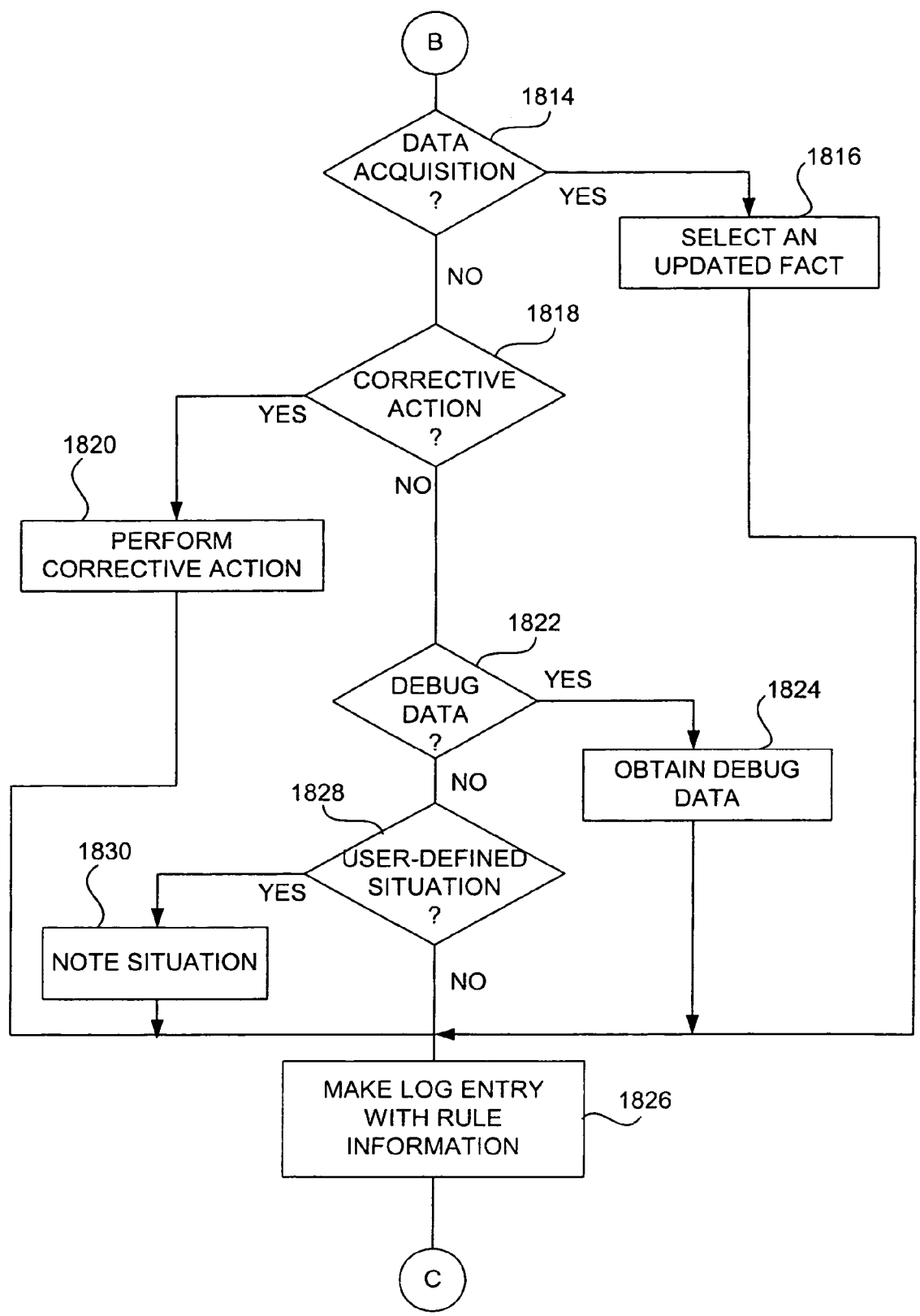

FIGS. 18A and 18B are flow diagrams of trigger/notification processing 1800 according to one embodiment of the invention. The trigger/notification processing 1800 is, for example, performed by a manager, such as the manager 108 illustrated in FIG. 1. In particular, the trigger/notification processing 1800 operates to trigger processing so that management information can be recorded and utilized, including initiation of notifications as appropriate.

The trigger/notification processing 1800 begins with a decision 1802 that determines whether a new fact has been asserted. When the decision 1802 determines that a new fact has not been asserted, then a decision 1804 determines whether a notification has been received. Here, the notifications could arrive from managed nodes. When the decision 1804 determines that a notification has not been received, then the trigger/notification processing 1800 returns to repeat the decision 1802. Once the decision 1802 determines that a new fact has been asserted or when the decision 1804 determines that a notification has been received, then a fact is asserted 1806 in the inference engine. The inference engine then processes the fact in the manager. For example, in the case of the manager 200 illustrated in FIG. 2, the inference engine is implemented by the knowledge processor 208. Next, a log entry is made 1808 into a log. The log entry indicates at least that the fact was asserted 1806.

Next, updated facts are retrieved 1810 for one or more rules that are dependent upon the asserted fact. Hence, the inference engine receives the asserted fact and determines which of the rules are dependent upon the asserted fact, and then for such rules, requests updated facts so that the rules can be fully and completely processed using up-to-date information.

Following the operation 1810, a decision 1812 determines whether the trigger/notification processing 1800 should stop. When the decision 1812 determines that the trigger/notification processing 1800 should stop, then those facts no longer needed are discarded 1813. Following the operation 1813, the trigger/notification processing 1800 is complete and ends. For example, a user might terminate the operation of the manager and thus end the trigger/notification processing 1800.

Alternatively, when the decision 1812 determines that the trigger/notification processing 1800 should not stop, then additional processing is performed depending upon the type of resource. For example, the resource or the rule being processed can signal for data acquisition, corrective action or debug operations. In particular, a decision 1814 determines whether data acquisition is requested. When the decision 1814 determines that data acquisition has been requested, then an updated fact is selected 1816. On the other hand, when the decision 1814 determines that data acquisition is being requested, then a decision 1818 determines whether corrective action is indicated. For example, a rule within the knowledge base can request a corrective action be performed. In any case, when the decision 1818 determines that a corrective action has been requested, then the corrective action is performed 1820.

Alternatively, when the decision 1818 determines that a corrective action is not being requested, then a decision 1822 determines whether debug data is being requested. When the decision 1822 determines that debug data is requested, then debug data is obtained 1824.

Alternatively, when the decision 1822 determines that debug data is not being requested, then a decision 1828 determines whether a user-defined situation has occurred. When the decision 1828 determines that a user-defined situation has occurred, then an action 1830 is taken noting the occurrence of the user-defined situation.

Following any on the operations 1816, 1820, 1824, 1830 or the decision 1828 when a user-defined situation is not present, a log entry is made 1826 into the log. The log entry indicates the firing of the rule along with the specifics of the resources (including their values) on the left-hand-side (or "if" part of the rule). Following the logging operation 1826, the trigger/notification processing 1800 returns to repeat the operation 1806 and subsequent operations so that additional facts can be asserted and similarly processed.

Additionally, a user of the management system may interact with a Graphical User Interface (GUI) to request a report. The report provides information to the user about the management state of the one or more managed products within the enterprise or computer system being monitored.

Figure 19:
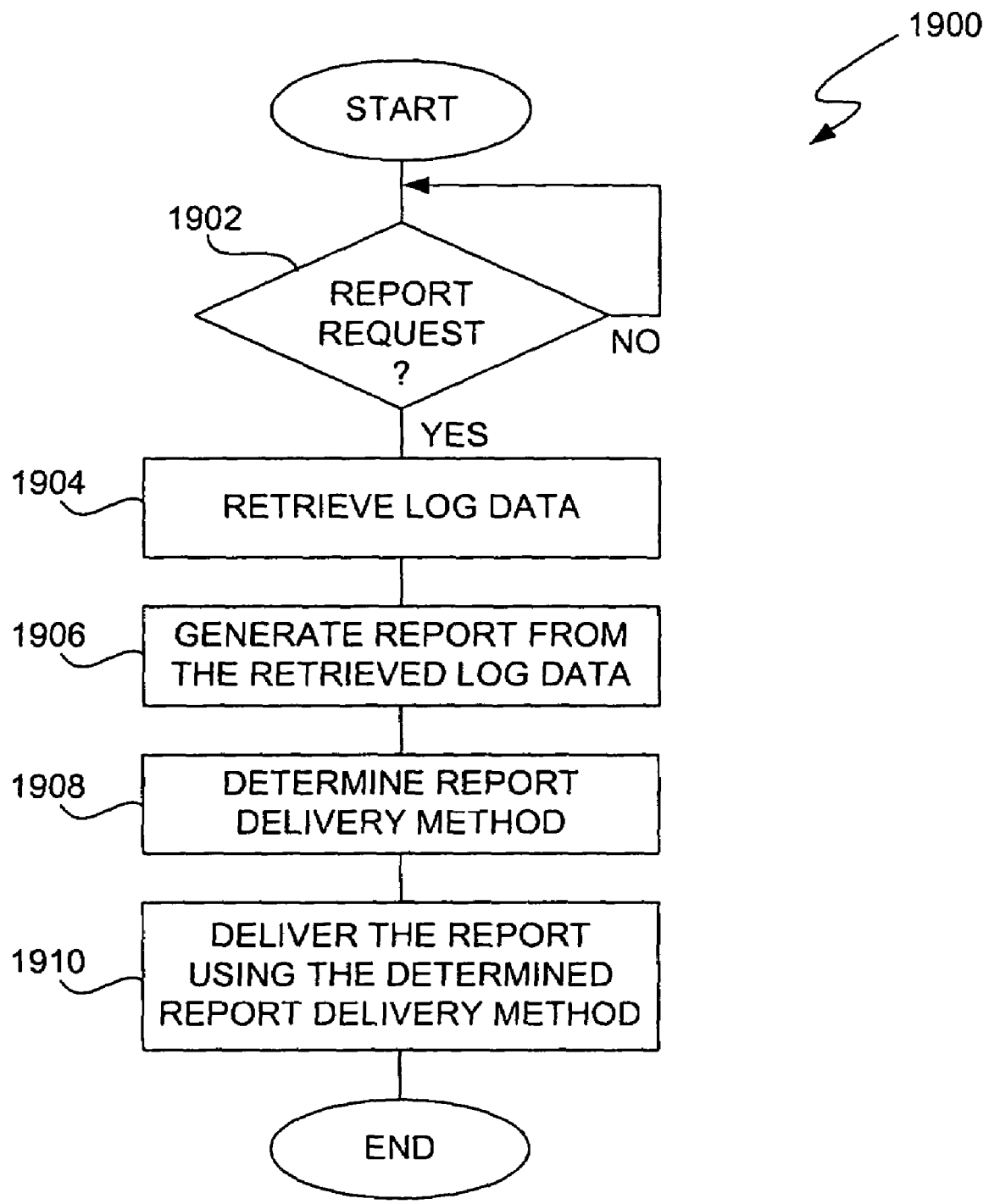
FIG. 19 is a flow diagram of GUI report processing according to one embodiment of the invention.

FIG. 19 is a flow diagram of GUI report processing 1900 according to one embodiment of the invention. The GUI report processing 1900 is, for example, performed by a manager. For example, the manager can be the manager 200 illustrated in FIG. 2.

The GUI report processing 1900 can begin with a decision 1902 that determines whether a report has been requested. When the decision 1902 determines that a report has not yet been requested, the GUI report processing 1900 awaits such a request. In other words, the GUI report processing 1900 can be considered to be invoked once a report request has been received. In any case, when the decision 1902 determines that a report request has been received, then log data is retrieved 1904. For example, with respect to the manager 200 illustrated in FIG. 2, the log data can be retrieved 1904 from the log module 220. After the log data is retrieved 1904, a report is generated 1906 from the retrieved log data.

The report might indicate the various facts and rules that have been utilized by the management system over a period of time. For example, a report might specify those of the rules that were "fired" and for each such rules, when it "fired," why it "fired," and action (if any) taken. Additionally, a report might include details on the actions taken and related values. Still further, if one of the actions taken is a debug action, then the report might also include debug data. A report can also be targeted or selective in its content based on criteria. For example, a report can be limited with respect to one or more of a certain time range, an event, exceptions, domains and/or rule packs.

Once the report has been generated 1906, a report delivery method is determined 1908. Here, the report delivery method can be pre-configured by an administrator of the management system to deliver reports to certain individuals or locations automatically. For example, the report can be delivered in the form of a notification that can be carried out using a pager, a voice mail, a voice synthesized telephone call, a facsimile, etc. Once the report delivery method has been determined 1908, the report is delivered 1910 using the determined report delivery method. It should be understood that the report delivery method can vary depending upon the nature of the report. For example, urgent reports can utilize one or more delivery methods that are more likely to reach the recipient immediately, such as a page or a mobile telephone call. Hence, the report can be delivered in a variety of different ways depending upon the application, circumstances and configuration of the management system. Following the delivery 1910 of the report, the GUI report processing 1900 is complete and ends.

FIGS. 20-29 are screen shots of a representative Graphical User Interface (GUI) suitable for use with one embodiment of the present invention. These screen shots detail how to create and maintain rules using the GUI.

How to Build a Rule Using Resources

To add (create) a rule, a user would access an Add New Rule page, such as shown in FIG. 20. Here, the user would perform the first step of four steps to follow in order to add a new rule. Namely, the user would enter a name and description for the rule and select a rule pack it belongs to. Upon pressing a Submit button, the process proceeds to the next step where you define the situation or the left-hand side of a rule, i.e. the conditions under which the rule will fire. Or, in other words, a list of situations and events (When this happens . . . ) which lead to the actions specified under the "Then define situation or do this . . . " header, which is referred to as the right-hand side of the rule. Predicates of the left-hand side are called antecedents and elements of the right-hand side are called consequents.

Figure 21:
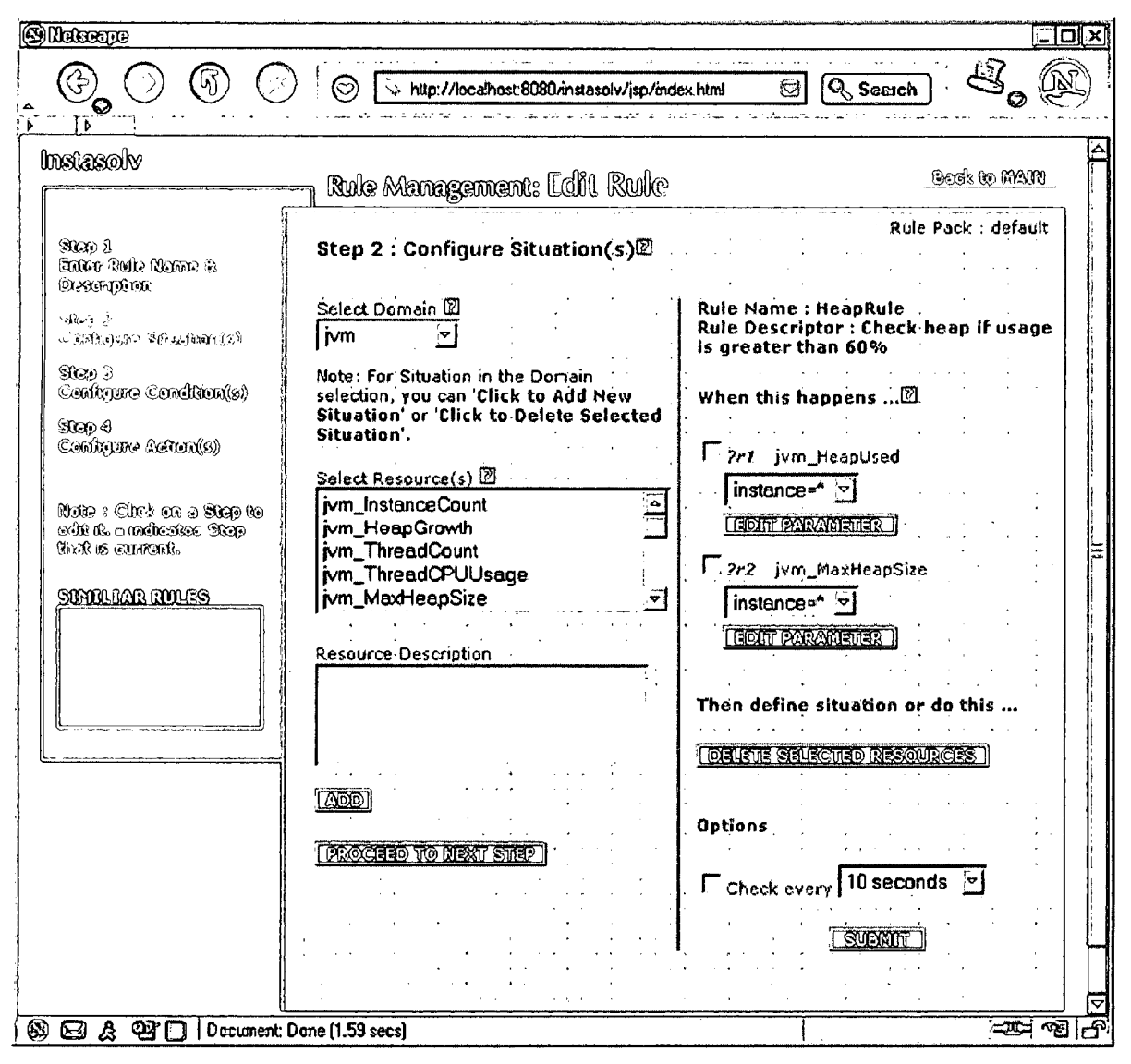

As shown in FIG. 21, to build the left-hand side of a rule, first choose a knowledge domain from a Domains list on the left side of the screen. After a domain is selected from the list the selection box below will be show all resources of that domain. There are two kinds of domains, physical and special (or virtual). A physical domain represents a collection of resources pertaining to a software component or an entire software product, for instance the Java Virtual Machine, as opposed to a special, or victual domain. A special domain represents a set of resources, which aren't associated with any "physical" knowledge domain. Instead such resources are used by the manager as building blocks to express conditions of the left-hand side or form actions on the right-hand side of a rule. In the representative rule being built, both a physical domain resource and a virtual domain resource are used. First, select the jvm domain from the list of domains and two resources of that domain to the right-hand side of the rule (see FIG. 21).

Figure 22:
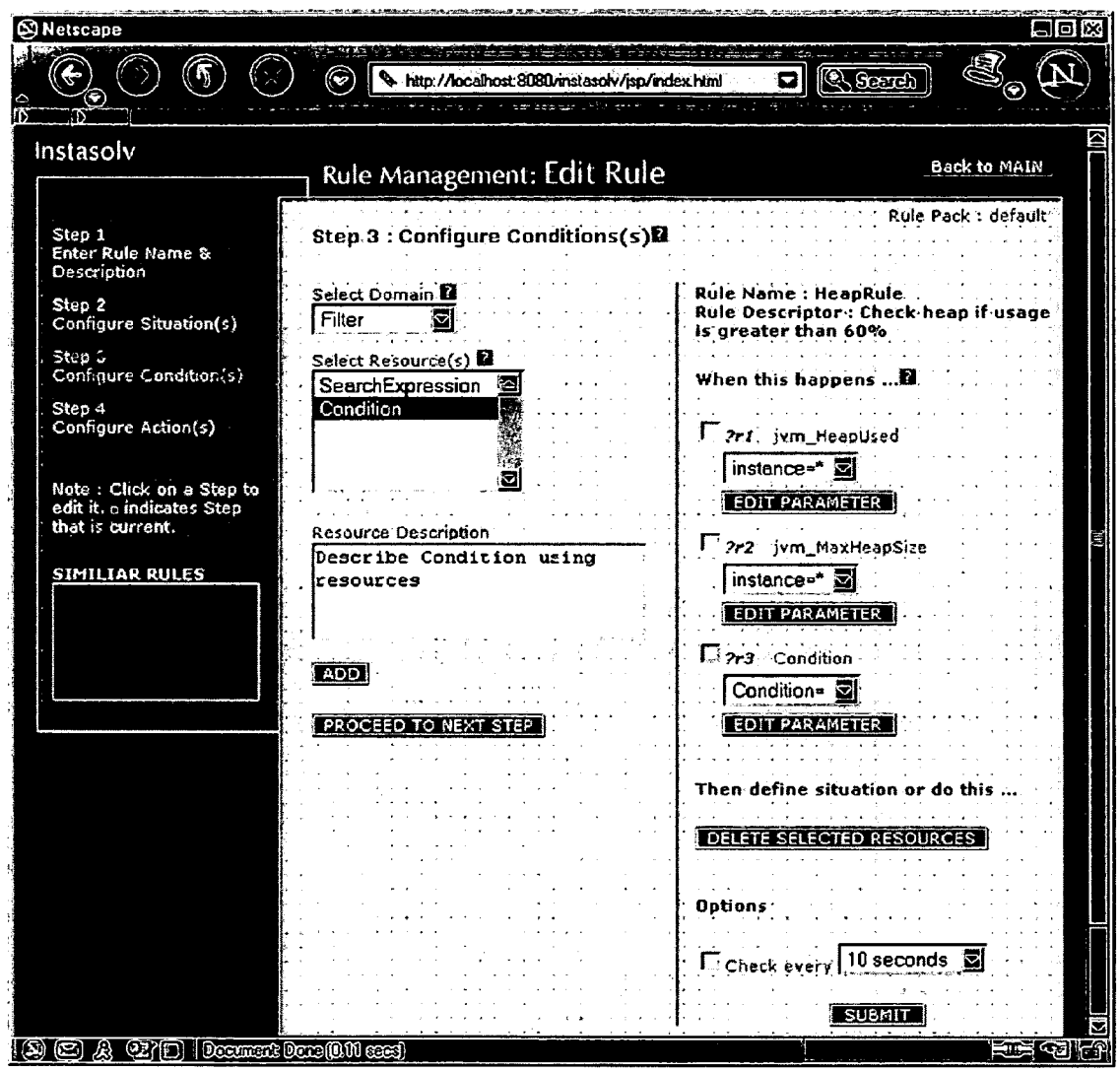

Once we have selected all the resources used to define the situation, the "proceed to next step" button is selected. The next step is where relationships between the selected resources and/or their thresholds are set to configure the condition for the rule to fire. Now, add a condition to the left-hand side of the rule. This condition basically states that when the amount of heap memory currently in use is greater than a certain percentage of the maximum heap memory available, the rule should fire. In order to add a condition to the left-hand side of a rule, choose the Filter special domain. As shown in FIG. 22, one of the domain resources in the selection box will be Condition. The user just selects "Condition" and clicks the add button.

Next, an Edit Parameter button for the condition is selected and the desired condition expression entered. Here, the condition expression shown entered in FIG. 23 binds the two JVM resources. The condition is typically defined as an expression. A simple example of a condition expression is (a>b).

Figure 23:
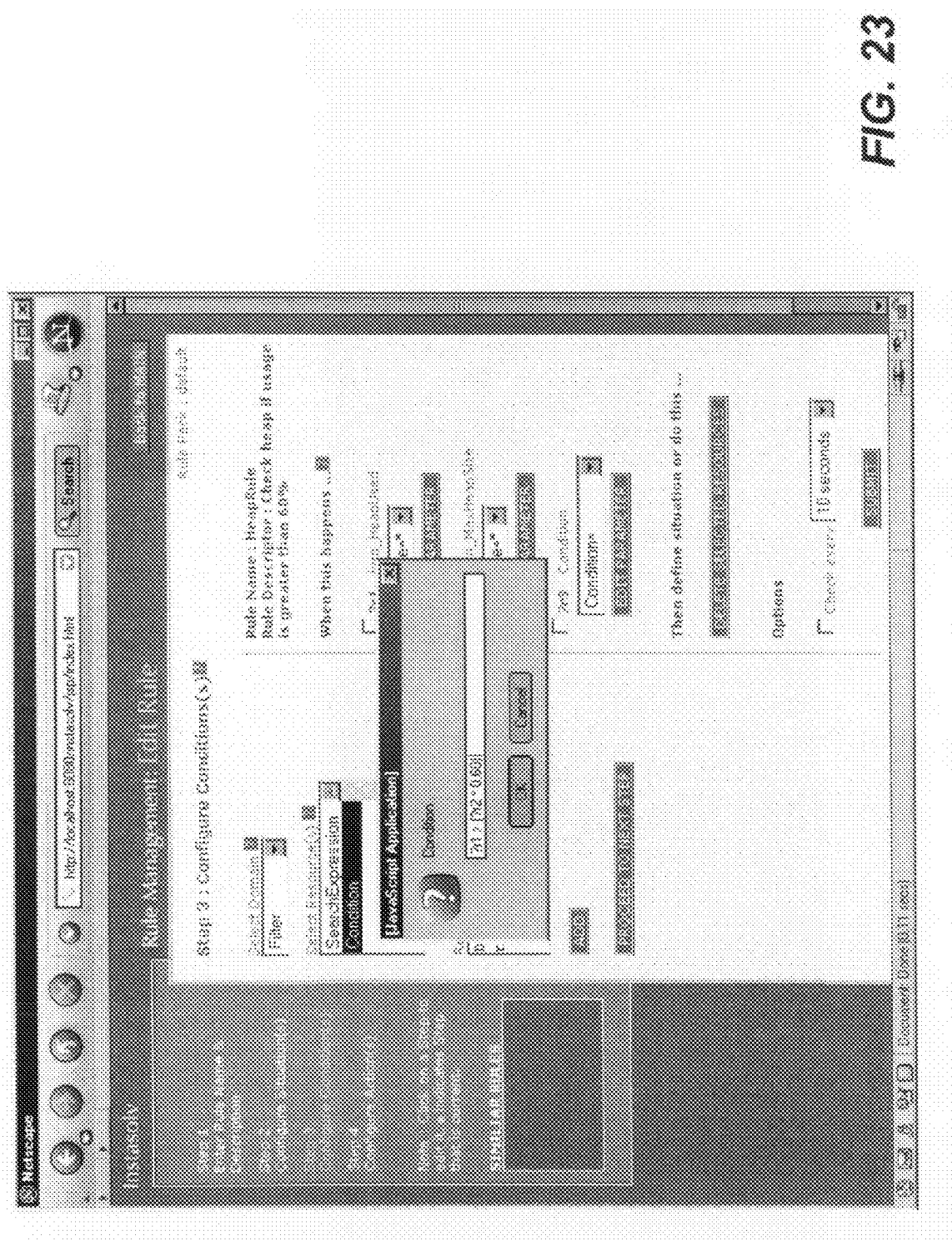

Let us look at detail how we came up with the condition expression in FIG. 23. Please refer to FIG. 22 for better illustration. Under the "When this happens . . . " header note that there are three distinct entries one below the other as follows—

?r1 jvm_HeapUsed

?r2 jvm_MaxHeapSize

?r3 Condition

Here ?r1, ?r2 and ?r3 are resource variable names assigned by the system to the resources jvm_HeapUsed, jvm_MaxHeapSize and Condition resources respectively. This is to facilitate the definition of the condition expression using the resource variable names only. A simplified example of a condition expression using resource ?r1 is (?r1>1000000), which states that the rule is considered true (or, gets "fired") in case jvm_HeapUsed exceeds 1000000 bytes or 1 MB. Note that, in this expression ?r1 and 1000000 are operands and > is a comparator operator in between the two operands.

In the condition expression ?r1>(?r2*060) in FIG. 23, the condition states that the rule is considered to be true if JVM heap being currently used (jvm_HeapUsed), ?r1, is greater than 60% of (or 0.60 times) the maximum allowed heap size (jvm_MaxHeapSize), ?r2.

Figure 24:
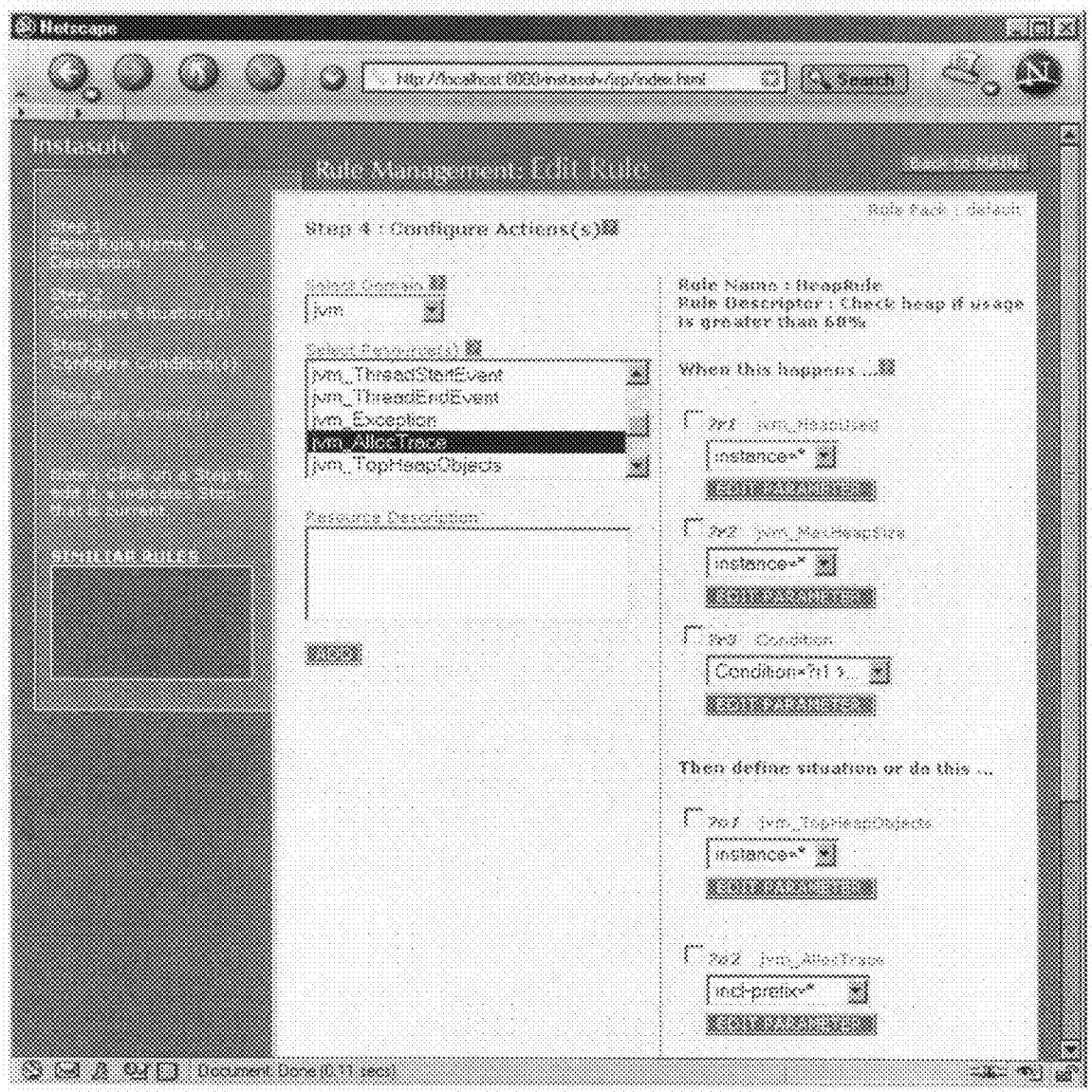

Now, as the left-hand side of the rule has been built, let us specify using the Configure Action(s) page shown in FIG. 24 to indicate what we want the system to do when the condition becomes true. Let's request the system produce a report on the class whose objects occupy most of the JVM heap and request a report on objects of the classes thus identified are allocated on the heap during the following 15 seconds.

Setting Up a Rule for Auto-diagnostics

Figure 25:
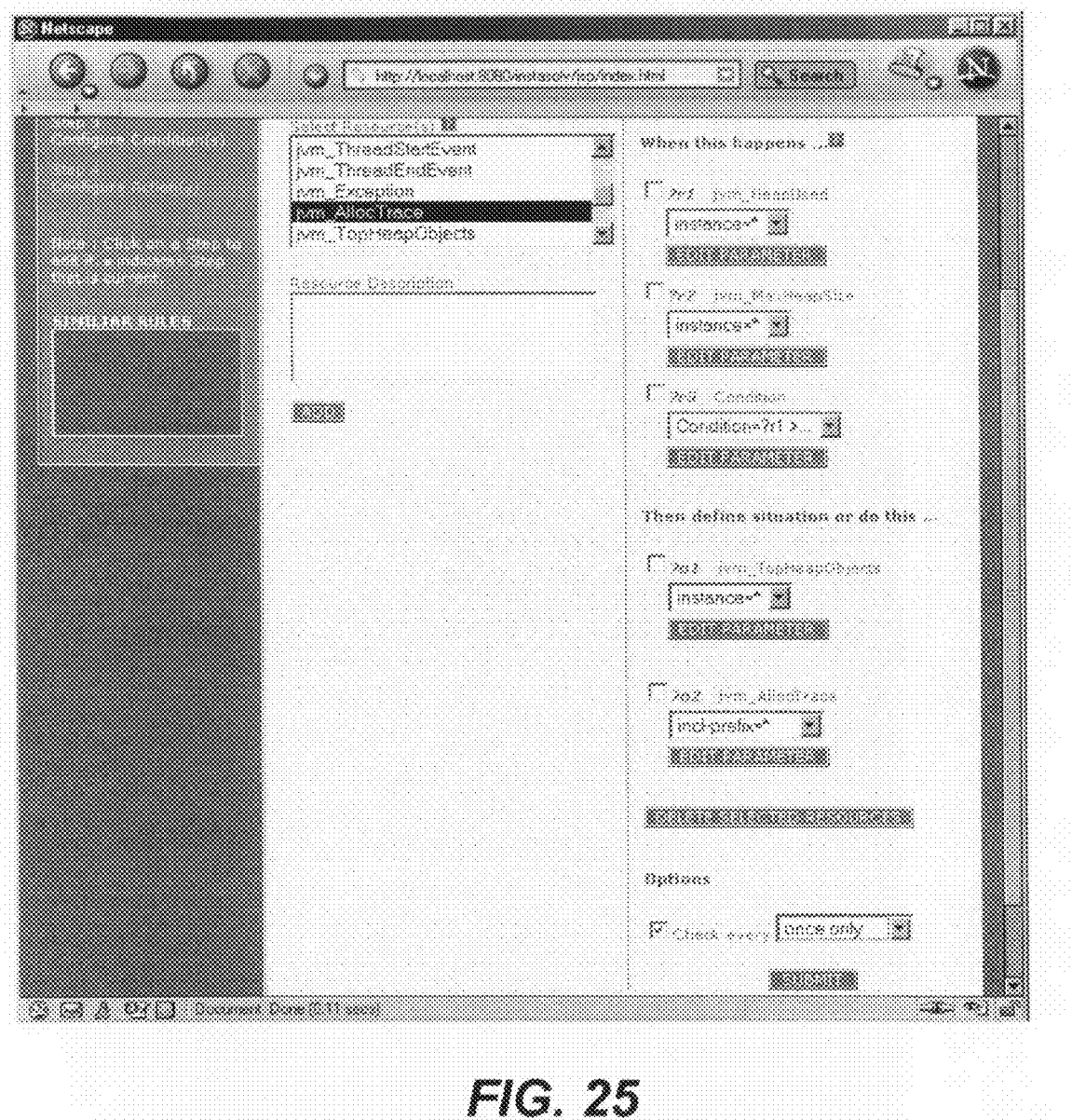

In order to test the rule that has been created (and also make sure that all components of the products are installed properly and communicate with each other), the manager should be set so that it considers the rule when the rule evaluation engine is started. Every rule can be configured in a flexible way. For instance, it can be set to be tested every 10 seconds, or every minute, or every hour. If you want a trial run of the rule as you run the engine, select a special option on the list of possible intervals, "once only," can be chosen. The testing interval can be set on the same Rule Editing page as shown in FIG. 25.

Chaining of Rules

The rule shown in FIG. 24 is a rule that defines conditions for an abnormal situation. If the defined situation occurs, the system is requested to take one or more actions. In this representative example, the actions are the two request for jvm_TopHeapObjects and jvm_AllocTrace on the right-hand side of the rule, under the "Then define situation or do this . . . " header. This kind of rule is useful, but its capabilities are limited. If instead of taking action right there in the rule, a situation is defined, then another rule can be built so that it gets triggered when this situation has been encountered. Through this mechanism, rules can be chained and hierarchies, or trees, of rules can be built.

Figure 26:
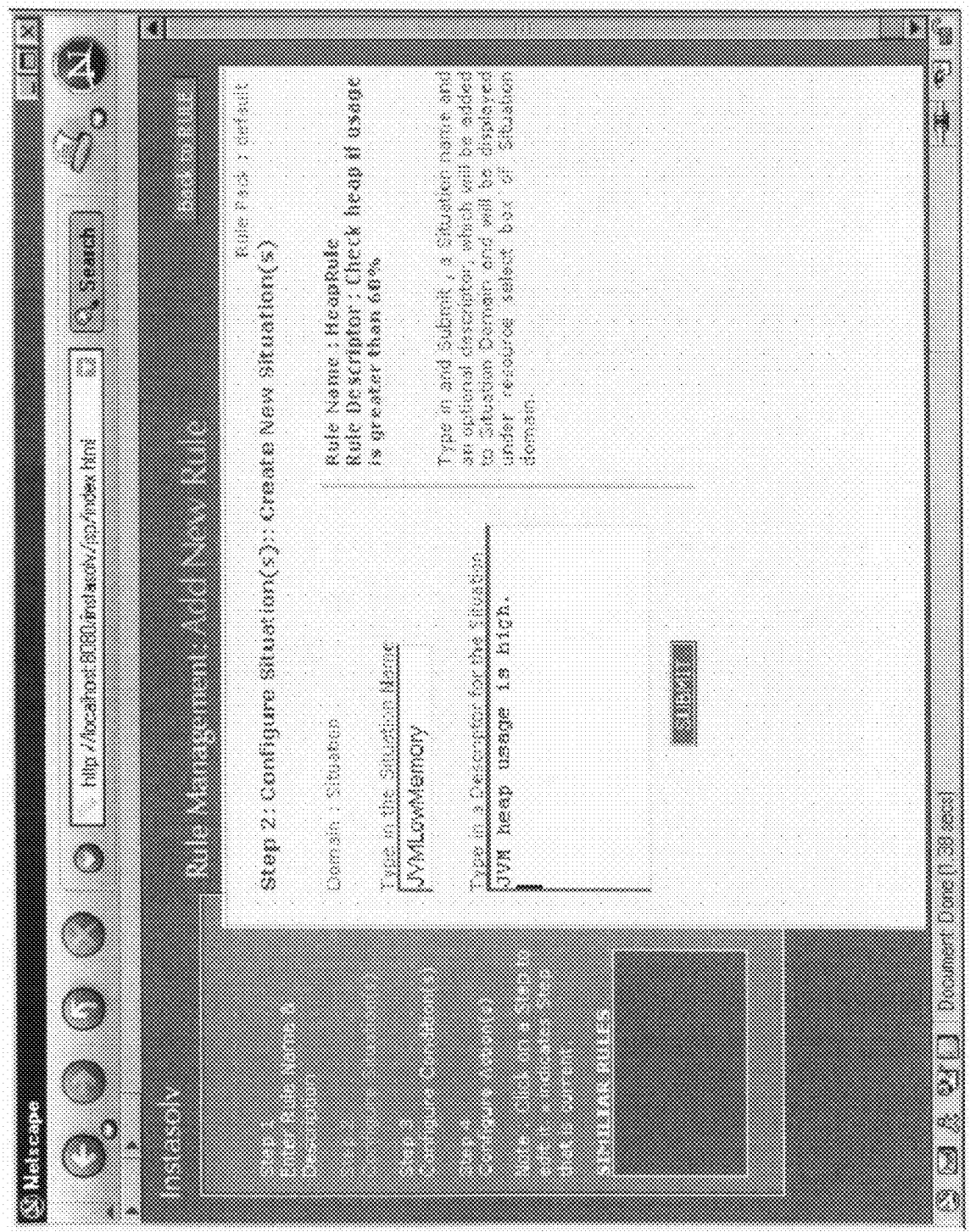

For example, for this rule to be turned into a rule that can potentially be chained to other rules, a new situation has to be defined, see FIG. 26. The situation can then be added to the rule as a consequent, see FIG. 27.

Figure 27:
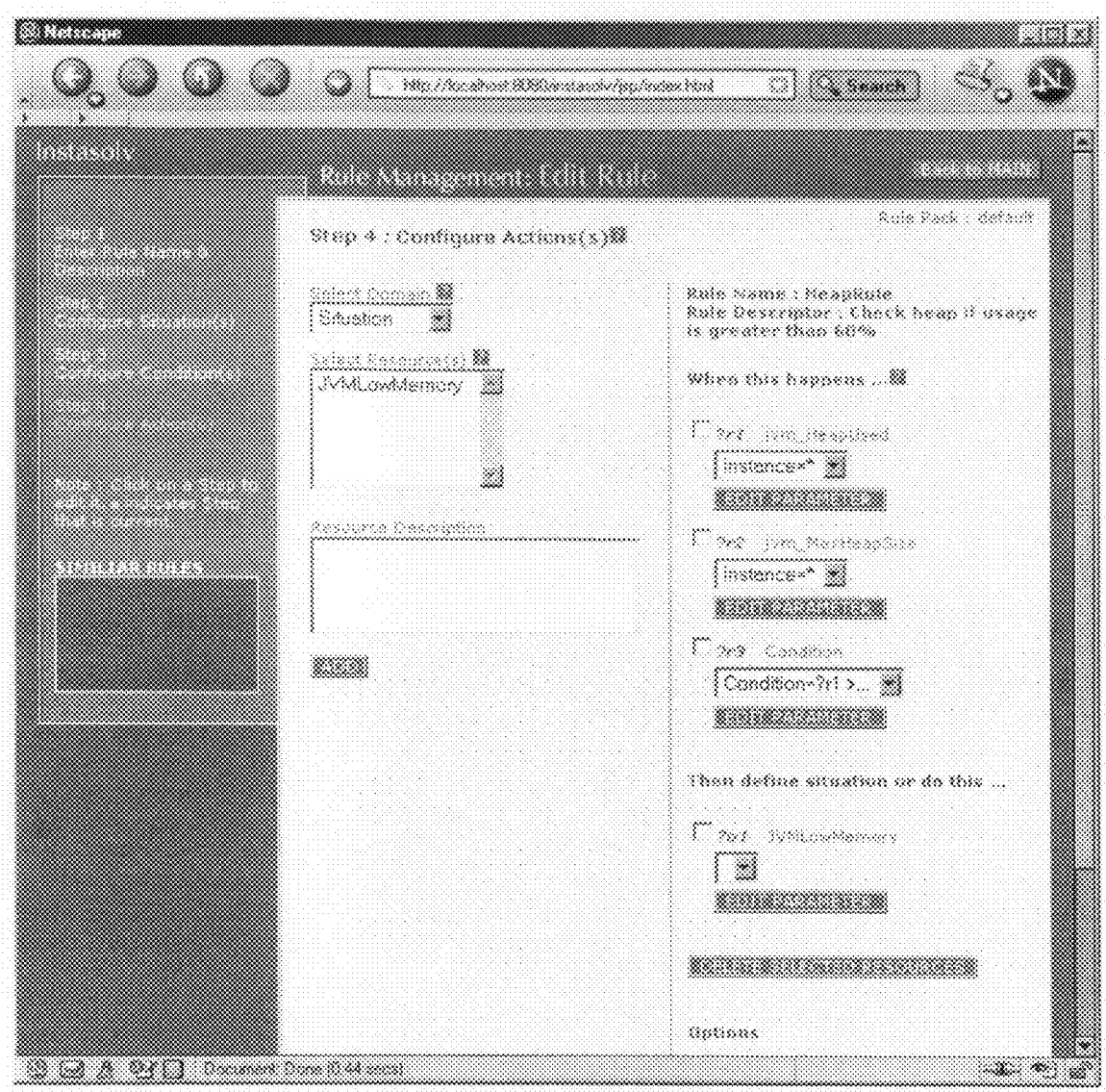

Thereafter, as desired, another rule or a set of rules can be defined with JVMLowMemory as the antecedent and the system will automatically chain these rules, i.e., the set of rules defined with JVMLowMemory on the left-hand side of the rule, will fire when the situation in FIG. 27 is declared in the modified rule in FIG. 24.

Editing Rules

Figure 28:
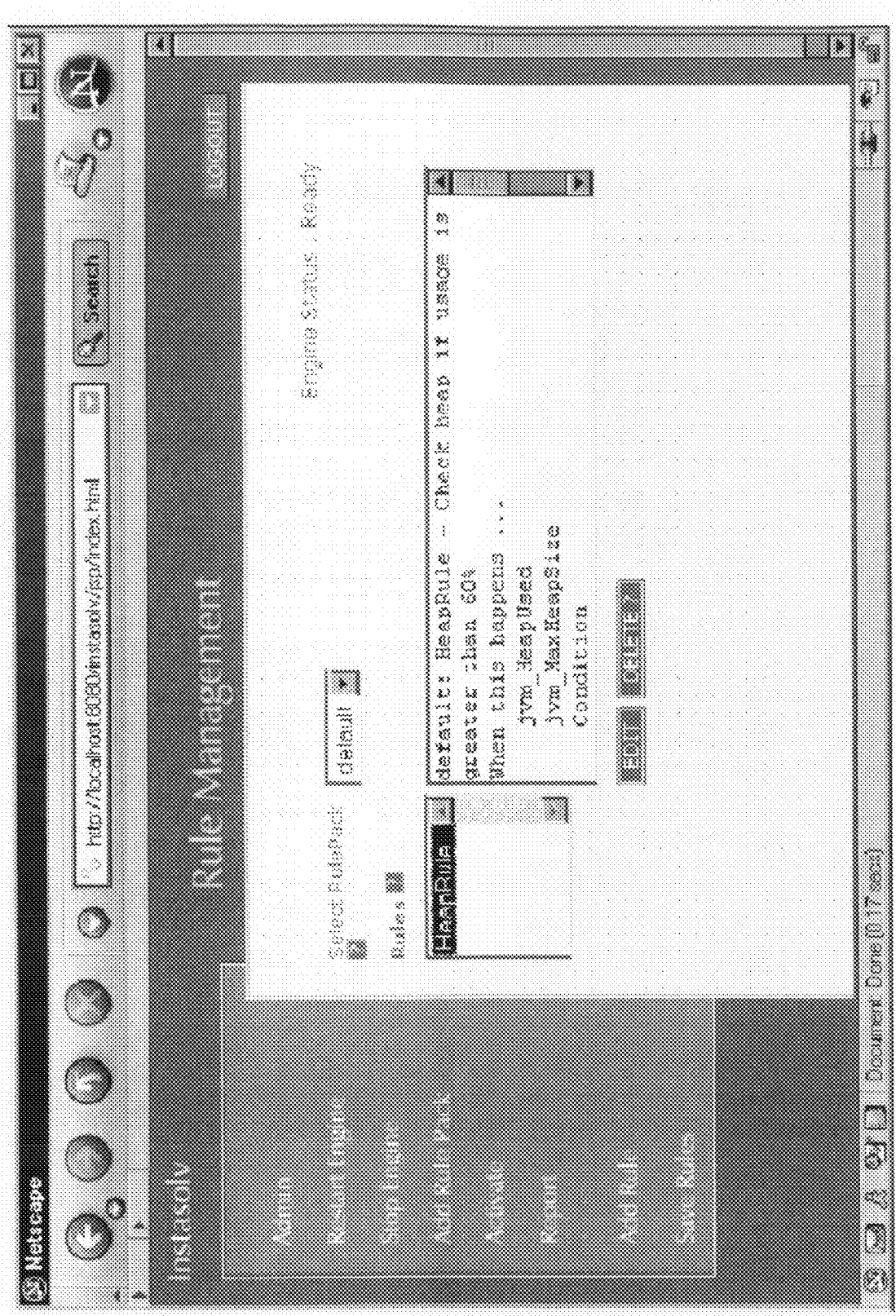

A previously defined (added) rule can be edited. To edit an existing rule, go to the Rule Management page, such as shown in FIG. 28, select an existing rule and click on the Edit button.

Starting and Stopping the Rule Engine

After a rule or a chain of rules has been created the system is ready to monitor the software on the managed nodes. In order to initiate this process, from the Rule Management page, start the rule engine by clicking on the (Re)Start Engine button. If the rules engine has to be stopped, press the Stop Engine button in the Rule Management page. If any of the rules were edited or new rules were added and you want these changes to take effect, the (Re)Start Engine button in the Rule Management page has to be pressed. This will cause the engine to stop, automatically pick up any changes that have been made, and restart.

Note that every time the manager process is started, the Rule Engine status can be Ready. The current status of the engine is displayed in the top right hand corner in the Rule Management page. For the rules to be fired according to time and condition set in its definition, the (Re)Start Engine button in the Rule Management page needs to be pressed explicitly. This changes the status of Rule Engine from Ready to Running. You have to do this every-time you add or make changes to rules and want the Rule Engine to pick up the additions/changes. As the engine gets into the running state, it checks resource values of the rules set up for periodic checking. In case all conditions on the left-hand side of such rule become valid, the engine will proceed with the actions on the on the right-hand side of the rule, after which the rule will become blocked for as long as the conditions are valid. Then, the rule will be marked active again. All activities of the engine in respect to rule firing and subsequent actions are reflected on the Report page. The page can be accessed through the Report button on the Rule Management page, such as shown in FIG. 28.

Report

Figure 29:
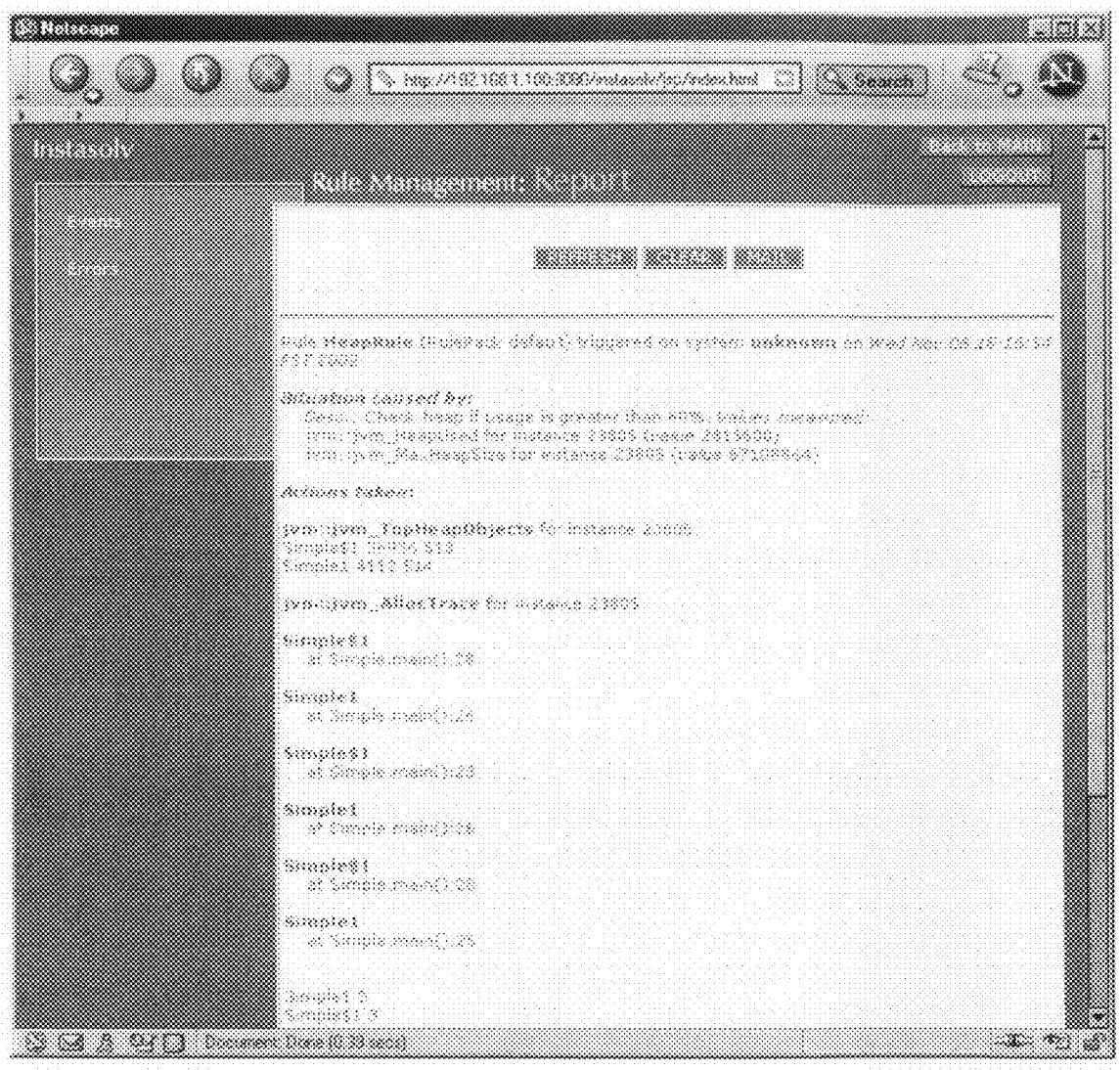

The Report page for our example above, with heap usage reduced to 1% and allocation tracing time reduced to 5 seconds, is shown in FIG. 29. The Report page has several functional buttons which are self-descriptive: a Refresh button is used for updates of the page so it reflects the latest report information, a Clear button will render the report page empty, a Mail button will allow the report to be sent via e-mail and the Done button will take you back to the main page, the Rule Management page.

The sample report shown in FIG. 29 is a result of running of the rule defined and shown in FIG. 24. The report reflects all important events associated with the system having run with the rule being activated for diagnostics. The first line of the report indicates that rule JVMHeap was fired and for what system the conditions of the rule became true and when it happened. Then values of the resources on the left-hand side of the rule, which led to the rule being triggered are shown. Under the Actions taken header the resources of the right-hand side are shown. First, the list of the classes whose objects take up most of the space on the JVM heap is requested. Filters excluding all standard classes (java.*, javax.*) are applied so that only two classes appear on the list. This is because the application run by our JVM is truly simple. The second action is a 15 second allocation trace report for objects of the classes found on the top heap objects list. Under jvm_AllocTrace you can see all allocations of objects of the two classes. Each allocation trace shows where, in what method of what class, it took place. It also shows the line number in the source code for that class, if available (such would be available when the source code was compiled without disabling the debugging information generation).

The invention can be implemented in software, hardware, or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A management system for at least one computer system, comprising:
   a plurality of agents residing within managed nodes of a plurality of different products used within the computer system;
   a system manager for said management system, said manager operating across the different products; and
   a data storage device storing at least a knowledge base, said knowledge base containing information pertaining to problems regarding the different products, the information pertaining to the different products including at least one collection of rules, and
   wherein the information within said knowledge base is updated based on contributions submitted by at least one user,
   wherein the knowledge base includes a plurality of separate knowledge domains, each of the knowledge domains being a logically separate piece of knowledge which can be installed and uninstalled as desired, and
   wherein said manager utilizes the knowledge domains and the at least one collection of rules in monitoring at least a plurality of the different products used within the computer system.

2. A management system as recited in claim 1, wherein the different products include at least a plurality of software products.

3. A management system as recited in claim 1, wherein said knowledge base is shared and used by a plurality of different organizations to manage their computer systems, the different organizations having the same or different product configurations on their computer systems.

4. A management system as recited in claim 1, wherein the information being contributed is integrated into the knowledge base in an automated manner.

5. A management system as recited in claim 1, wherein the rules include rules specific to root-cause analysis.

6. A management system as recited in claim 5, wherein said manager further comprises an inference engine that evaluate the rules.

7. A management system as recited in claim 1, wherein the information in said knowledge base is described using thresholds on resource information and relationships between resource information from the different products.

8. A management system as recited in claim 7, wherein the information contributed to the information within said knowledge base is provided by a plurality of users through use of one or more graphical user interfaces.

9. A management system as recited in claim 1, wherein said knowledge base includes possible causing symptoms for previously observed problems at other sites or computer systems.

10. A management system as recited in claim 9, wherein each of the different products being managed has at least one application component, and
   wherein the causing symptoms pertain to resource information from the application component of the different products.

11. A management system as recited in claim 1, wherein said manager determines within which of the different products a problem arises.

12. A management system as recited in claim 11, wherein after said manager determines within which of the different products the problem arises, said manager initiates a reporting or corrective action.

13. A management system as recited in claim 1, wherein said management system performs just-in-time or near real-time diagnosis to determine which of the different products a problem has arisen or is likely to arise.

14. A management system as recited in claim 1, wherein said management system operates on a separate computer that is connected to the computer system being managed.

15. A management system as recited in claim 1, wherein said management system is for a plurality of computer systems, and wherein said manager is central and operable across the different products on the different computer systems.

16. A management system as recited in claim 1, wherein said knowledge base is updated by contributions from other users.

17. A management system as recited in claim 1, wherein the managed nodes can be managed by more than one of said management systems.

18. A management system as recited in claim 1, wherein said manager receives a rule submitted via a graphical user interface, validates the rule and, if validated, integrates the rule into the knowledge base.

19. A management system as recited in claim 1, wherein the update to said knowledge base is distributed to a central knowledge base.

20. A management system as recited in claim 1, wherein the update to said knowledge base is built from and shared by different users across different products to leverage knowledge.

21. A management system as recited in claim 20, wherein the computer system is an enterprise computer system.

22. A management system as recited in claim 1, wherein said manager is configured to manage the computer system by operating to: (i) receive a fact pertaining to a condition of one of the plurality of different products that are operating in the computer system; (ii) assert the fact with respect to an inference engine, the interference engine using rules based on facts; (iii) retrieve updated facts from the interference engine from those of the rules that are dependent on the fact that has been asserted; and (iv) perform an action in view of the updated facts.

23. A management system as recited in claim 22, wherein the different products send resource information to the interference engine to process rules that depend on at least one fact representing the resource information.

24. A management system as recited in claim 23, wherein the action includes a debug data acquisition.

25. A management system as recite din claim 24, wherein the debug action further asserts at least one fact with respect to the interference engine.

26. A management system as recited in claim 22, wherein the interference engine obtains resource information from the different products to process rules based on at least one fact already asserted.

27. A management system as recited in claim 1,
wherein the computer system is an enterprise computer system, and
wherein said manager isolates a root cause of a software problem in the enterprise computer system supporting a plurality of software products.

28. A management system as recited in claim 27,
wherein the different products include at least a plurality of software products,
wherein the knowledge base includes causing symptoms and experienced problems provided by a disparate group of personal contributors, and
wherein the manager is configured to examine the knowledge base with respect to the software problem to isolate the cause of the software problem to one of the software products.

29. A management system as recited in claim 28, wherein the causing symptoms pertain to resources of the software products.

30. A management system as recited in claim 27, wherein the knowledge base further includes corrective actions for certain software problems.

31. A method as recited in claim 30, wherein said manager is configured to manage the computer system by operating to automatically perform a correction operation to attempt correction of the software problem, the correction operation being associated with one of the corrective actions within the knowledge base that is suitable for use with the software problem.

32. A management system as recited in claim 27, wherein a repeating symptom cause can be ignored until after the cause ceases to exist at least once.

33. A management system as recited in claim 1, wherein said management system performs diagnosis to determine which of the different products a problem has arisen or is likely to arise, and
wherein said management system can send a notification including information on the diagnosis to at least one recipient.

34. A management system as recited in claim 1, wherein when an additional product is used within the computer system, an additional knowledge module is obtained and included within the knowledge base used by said manager so as to potentially diagnosis problems associated with the plurality of different products as well as the additional product.

35. A management system as recited in claim 1, wherein at least one of the rules in the least one collection of rules can be edited.

\* \* \* \* \*